(12) United States Patent
Originale Di Criscio et al.

(10) Patent No.: US 9,981,192 B2
(45) Date of Patent: *May 29, 2018

(54) CONDUCTING ARTISTIC COMPETITIONS IN A SOCIAL NETWORK SYSTEM

(71) Applicant: Musixster, LLC, Beverly Hills, CA (US)

(72) Inventors: Alessandro Originale Di Criscio, Beverly Hills, CA (US); Francesco Claude Originale Di Criscio, Beverly Hills, CA (US)

(73) Assignee: MUSIXSTER, LLC, Beverly Hills, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/468,019

(22) Filed: Mar. 23, 2017

(65) Prior Publication Data

US 2017/0189817 A1    Jul. 6, 2017

Related U.S. Application Data

(63) Continuation of application No. 14/195,315, filed on Mar. 3, 2014, now Pat. No. 9,669,299.

(51) Int. Cl.
*A63F 13/12* (2006.01)
*A63F 13/798* (2014.01)
*A63F 13/335* (2014.01)
*A63F 13/814* (2014.01)

(52) U.S. Cl.
CPC .......... *A63F 13/798* (2014.09); *A63F 13/335* (2014.09); *A63F 13/814* (2014.09); *A63F 2300/407* (2013.01); *A63F 2300/8047* (2013.01)

(58) Field of Classification Search
CPC ..... A63F 13/798; A63F 13/335; A63F 13/814
See application file for complete search history.

(56) References Cited

U.S. PATENT DOCUMENTS

| 7,162,433 | B1* | 1/2007 | Foroutan | G06Q 10/063114 705/12 |
| 2007/0169165 | A1* | 7/2007 | Crull | G06F 17/3089 725/135 |
| 2007/0244570 | A1* | 10/2007 | Speiser | G06Q 50/10 700/1 |
| 2008/0126197 | A1* | 5/2008 | Savage | G06Q 50/10 705/319 |
| 2009/0198575 | A1* | 8/2009 | Kapila | G06Q 30/02 705/14.46 |

(Continued)

FOREIGN PATENT DOCUMENTS

WO    WO 02/41211 A1    5/2012

OTHER PUBLICATIONS

Notice of Allowance and Fee(s) Due for U.S. Appl. No. 14/195,315, (dated Jan. 30, 2017).
Notice of Allowance and Fee(s) due for U.S. Appl. No. 14/195,315 (dated Oct. 26, 2016).
Final Office Action for U.S. Appl. No. 14/195,315 (dated Jan. 20, 2016).

(Continued)

*Primary Examiner* — Corbett B Coburn
(74) *Attorney, Agent, or Firm* — Jenkins, Wilson, Taylor & Hunt, P.A.

(57) ABSTRACT

Tools, strategies, and techniques are provided for connecting an audience comprising artists of many different kinds with a wider audience of other users to engage in competitions, provide commentary, review communications, and perform other activities around works of art.

30 Claims, 39 Drawing Sheets

(56) References Cited

U.S. PATENT DOCUMENTS

| | | | |
|---|---|---|---|
| 2010/0121857 A1* | 5/2010 | Elmore | G06F 17/30702 707/748 |
| 2011/0225024 A1* | 9/2011 | Seyer | G07C 13/00 705/12 |
| 2011/0300916 A1* | 12/2011 | Patchen | A63F 13/12 463/1 |
| 2012/0123570 A1 | 5/2012 | Guinn | |
| 2012/0179557 A1* | 7/2012 | Gross | G06Q 30/02 705/14.73 |
| 2012/0215708 A1 | 8/2012 | Polk | |
| 2013/0157737 A1 | 6/2013 | Daly | |
| 2013/0204692 A1* | 8/2013 | Mallory | G06Q 50/01 705/14.36 |
| 2013/0237323 A1 | 9/2013 | Alman et al. | |
| 2015/0120446 A1* | 4/2015 | Judd | G07C 13/00 705/14.54 |
| 2015/0127127 A1* | 5/2015 | Carpenter | G06Q 30/0631 700/92 |
| 2015/0161663 A1* | 6/2015 | Klein | G06Q 50/01 705/14.5 |
| 2015/0246281 A1 | 9/2015 | Originale Di Criscio et al. | |

OTHER PUBLICATIONS

Applicant Initiated Interview Summary for U.S. Appl. No. 14/194,315 (dated Oct. 21, 2015).

International Search Report and the Written Opinion of the International Searching Authority for International Application No. PCT/US15/18439 (dated Jun. 24, 2015).

Non-Final Office Action for U.S. Appl. No. 14/195,315 (dated Jun. 23, 2015).

Maranzani, "5 Facts About Pearl Harbor and the USS Ariziona," http://www.history.com/news/5-facts-about-pearl-harbor-and-the-uss-arizona, pp. 1-3 (Dec. 7, 2011).

Applicant Initiated Interview Summary for U.S. Appl. No. 14/195,315 (dated Jun. 8, 2015).

Applicant Initiated Interview Summary for U.S. Appl. No. 14/195,315 (dated Feb. 20, 2015).

Final Office Action for U.S. Appl. No. 14/195,315 (dated Dec. 15, 2014).

Applicant Initiated Interview Summary for U.S. Appl. No. 14/195,315 (dated Nov. 5, 2014).

Non-Final Office Action for U.S. Appl. No. 14/195,315 (dated Aug. 15, 2014).

* cited by examiner

| Bulletin | Journal | Notifications | Championship | Profile | Bazaar |
|---|---|---|---|---|---|

All Rankings

Pop

Rock

R&B

Master Class

Second Class

Third Class

Fourth Class

TABLE LEAGUE

N.1 Smith Pts. 78 [Challenge]

Solingen Pts. 75 [Challenge]

Pamlico Pts. 68 [Challenge]

CURRENT BATTLES

Smith vs. Pamlico  33:00  [Vote]

BATTLES PANEL

| Battles Status Bar | Days to go | Username | VS | Opponent Name |
|---|---|---|---|---|
| Battles Status Bar | Days to go | Username | VS | Opponent Name |
| Battles Status Bar | Days to go | Username | VS | Opponent Name |

FIG. 15

CONDUCTING ARTISTIC COMPETITIONS IN A SOCIAL NETWORK SYSTEM

PRIORITY CLAIM

This application is a continuation of U.S. Pat. No. 9,669,299, filed Mar. 3, 2014, the disclosure of which is incorporated herein by reference in its entirety.

BACKGROUND

Artists can create works of many different forms, through many different media, including musical compositions, visual and graphical arts, theatrical presentations, and even culinary creations.

The inventors have discovered that the act of experiencing artistic works can be enhanced by engaging an audience comprising a wide variety of both artists and other users to review works of art through an online social networking environment, for example. Many conventional media for communicating information about artistic works do not provide sufficient means for users to express their opinions regarding the relative worth of different works of art. Likewise, artists do not have an adequate outlet or communication medium to showcase their talents and to compare their works of art against other artists within similar fields of artistic endeavor.

In addressing issues with current methods and systems for experiencing and evaluating works of art, the inventors have recognized a need for more effective computer-implemented tools, strategies, and techniques that can help artists and other users to share and compare works of art, and ultimately to enhance their enjoyment of different artistic creations.

BRIEF DESCRIPTION OF FIGURES

The utility of the embodiments of the invention will be readily appreciated and understood from consideration of the following description of the embodiments of the invention when viewed in connection with the accompanying drawings, wherein:

FIGS. 13A through 15 include examples of screen displays that can be displayed to users in a championship section of a social network system structured in accordance with various embodiments of the invention;

DESCRIPTION

In various embodiments, the invention offers tools, strategies, and techniques for connecting an audience comprising artists of many different kinds with a wider audience of other users to engage in competitions, provide commentary, review communications, and perform other activities around works of art. As applied herein, "works of art" may include a wide variety of artistic creations by different types of artists including, for example and without limitation, musical compositions (and mixing versions thereof), visual and graphical arts, theatrical presentations, and culinary creations, among others.

Figure 1:
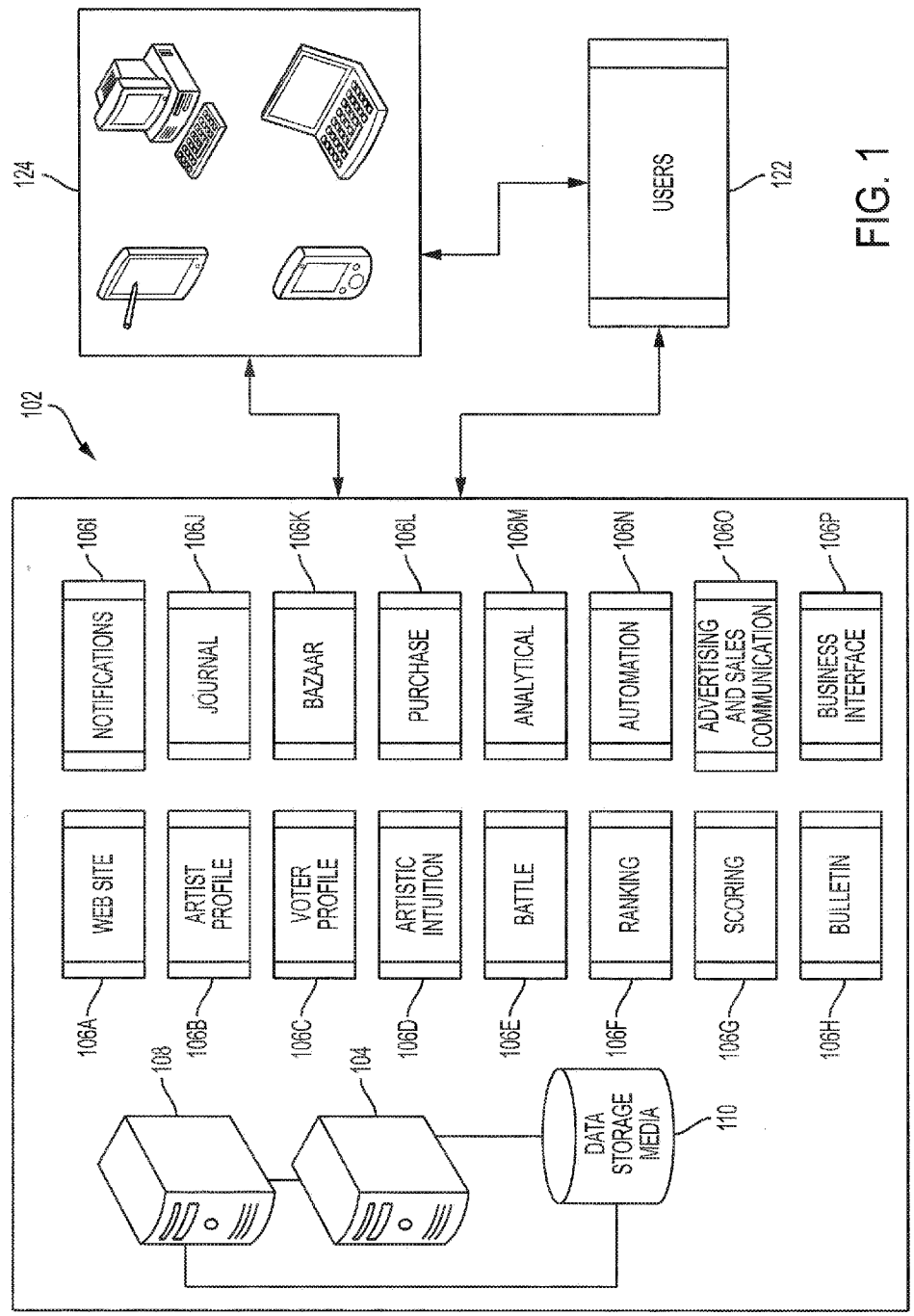
FIG. 1 includes a system architecture diagram including an example of a social network system structured in accordance with various embodiments of the invention.
Figure 2A:
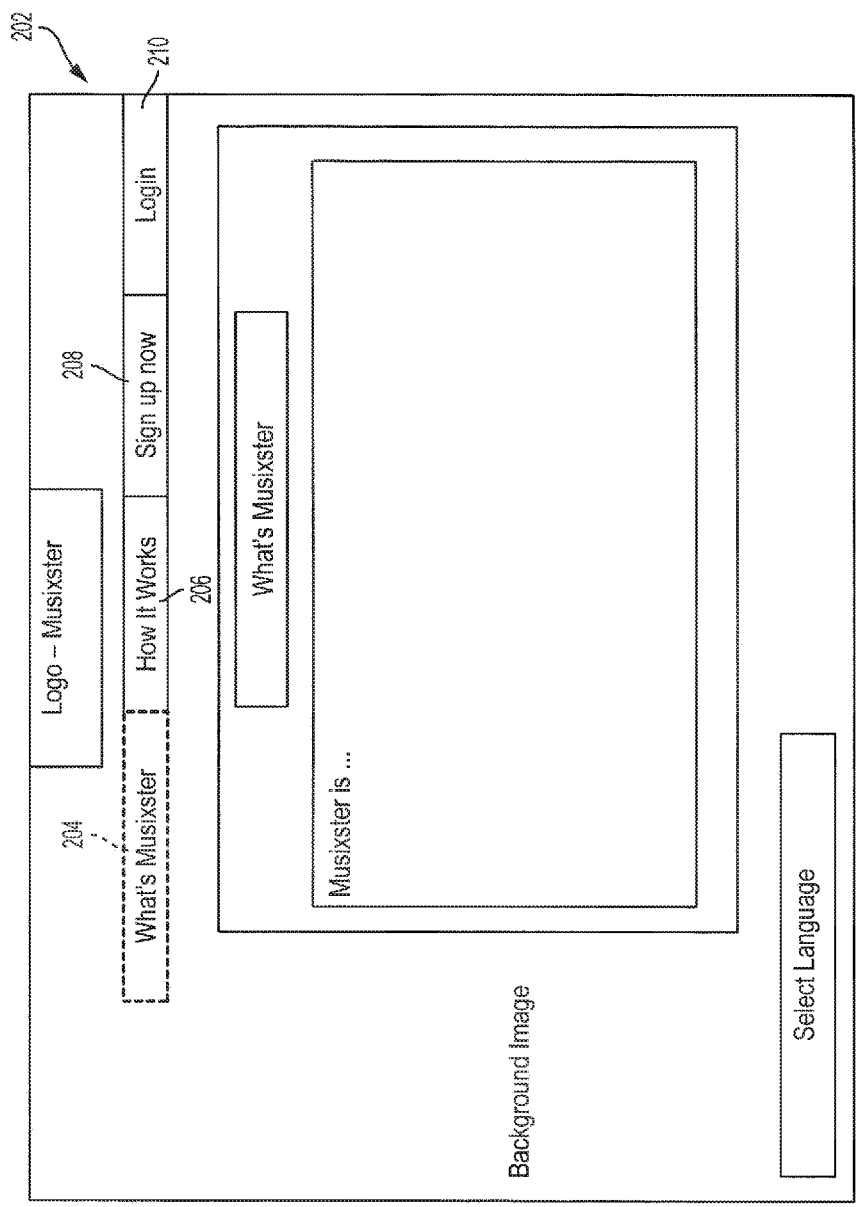
FIGS. 2A-2D illustrate various screen displays provided in accordance with examples of main page and registration features of certain embodiments of the invention.
Figure 2B:
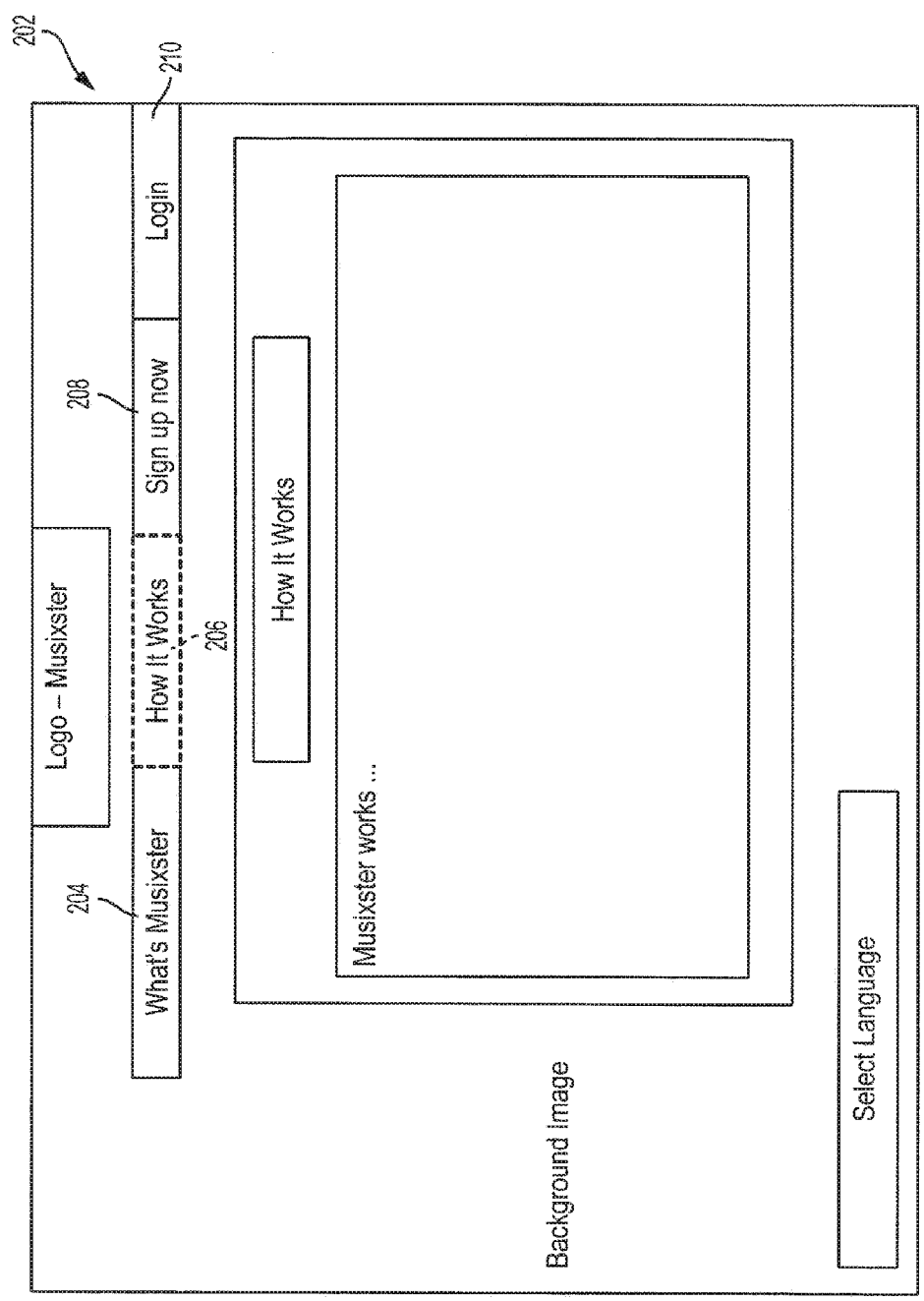
Figure 2C:
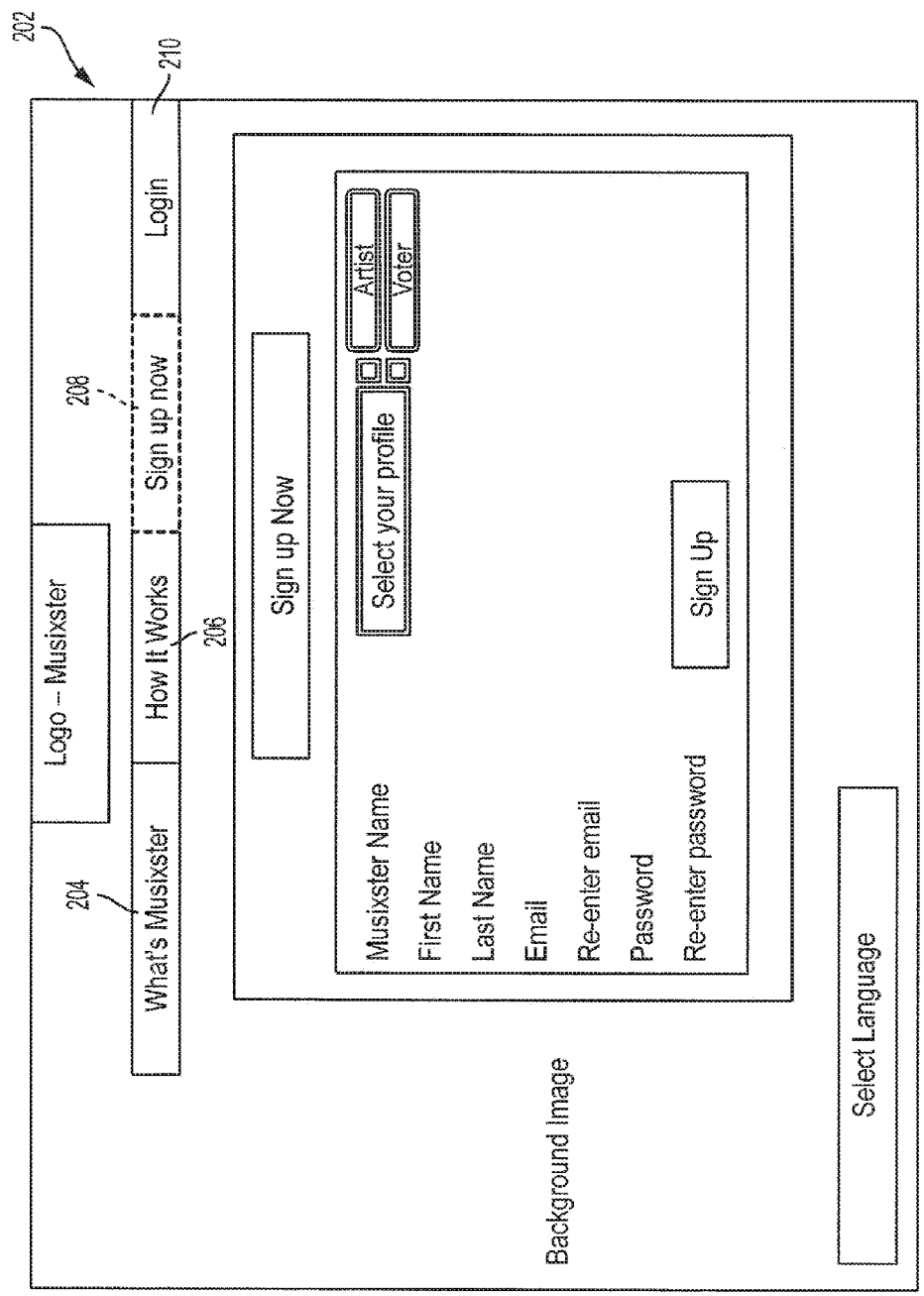
Figure 2D:
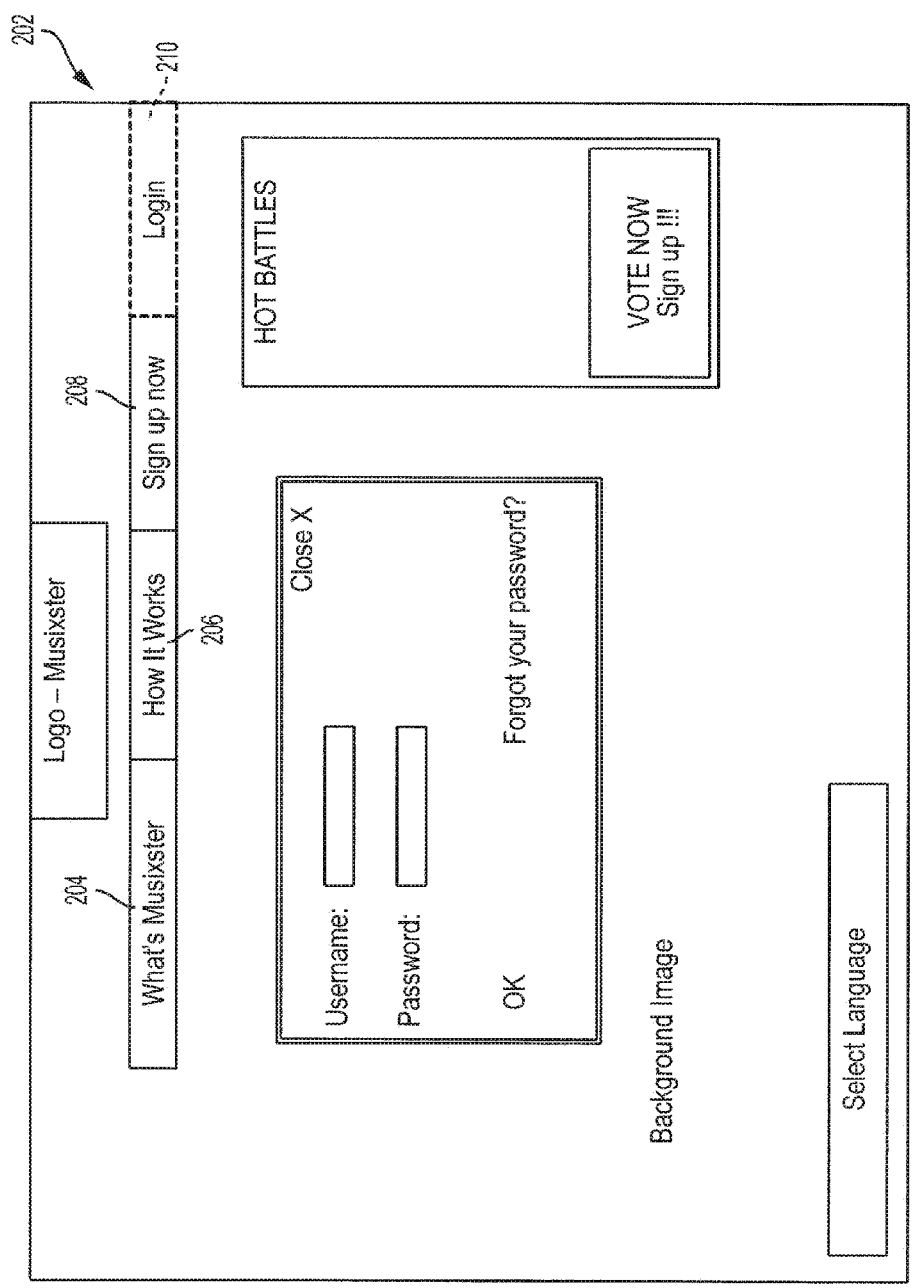

In certain embodiments, with reference to FIG. 1, aspects of the invention may include a social network system 102 which is programmed for connecting artists (e.g., solos, groups, producers, DJ's, etc.) and a wider audience of users from all around the world. The system 102 may employ web application software, for example, programmed for conducting online competitions and dedicated news and polling systems, among other features. An online gaming competition environment can be provided with online tournaments in which artists compete against each other through a battle module with the aim to earn victory points to win and advance through a championship designation framework. The system 102 may be programmed for uploading and comparing artists' songs, for example, which may be limited in certain embodiments to only original works created by the artists.

The competitions may be conducted by artists selecting audio/video tracks of their art works to be played, displayed, or otherwise accessed through the social network system 102. Winners of these competitions can be determined by an online audience of users comparing works of art and casting votes to determine a winner, for example. Other features provided by the social network system 102 may include polling, information, and news systems designed for processing communications related to works of art and related topics. Various embodiments of the invention can be configured to be accessed, for example, through a combination of web-based social network services, application software, and tablet and mobile device implementations, including various systems of interconnected computers and device networks.

FIG. 1 includes one example of a system architecture for a social network system 102 structured and configured in accordance with various embodiments of the present invention. In the example shown, the system 102 may include a web server 104 programmed to host a web site through a web site module 106A. One or more web sites configured, generated, and/or displayed by the web server 104 may be based on a LAMP stack (i.e., a combination of components derived from Linux, Apache, MySQL, and PHP), for example. The system 102 may also include an application server 108 programmed to process transactions associated with accessing and/or using the system 102, such as transactions or other processing including data arising from various competitions conducted between or among artists, for example. In various embodiments, the system 102 may include various modules 106A-106P (as described in more detail herein), which include computer-based instructions for directing a processor or computer system to perform different tasks or functions within the system 102. In various embodiments, one or more databases 110 or other types of data storage media may be provided for storing, retrieving, and/or accessing data and other information processed through the system 102.

In various embodiments, one or more different types of users 122 may access or communicate with the system 102 through a variety of access devices 124. Such users 122 may include artists, voters, experts, journalists, business personnel, or many other kinds of users 122. Examples of access devices 124 include, without limitation, desktop computers, laptops, notebooks, mobile devices (e.g., phones, smart phones, tablets, etc.), or many other types of computing devices or computer systems. Communications which occur between or among the system 102, the various users 122, and/or the access devices 124 may be conducted through one or more kinds of communication media, such as networked media, wireless media, and/or wireline connections, for example.

FIGS. 2A through 2D illustrate examples of different aspects of a main page 202, which may be communicated to users by the social network system 102 in accordance with various embodiments of the invention. As shown, the main page 202 may include sections 204, 206 that provide educational information for users on what services are offered (see FIG. 2A) and how the competitions or "battles" between different artists are conducted (see FIG. 2B). A "sign up now" section 208 may be configured to receive information from artists and voters to allow them to register with and access the system 102 (see FIG. 2C).

In certain embodiments, "artists" are designated as users who have the ability to enter works of art into competitions; and "voters" are general users of the system 102 who can vote on competitions between different artists. The designation of "artist" or "voter" may determine which portions of the system 102 that a given user can access, view, or modify. For example, an "artist" account may be limited to users who produce their own original music (producers, solos, groups, DJ's) or other original works of art. An artist account may be required to choose one music genre, for example, and can be enrolled for competition and championship purposes in that chosen music genre. In certain embodiments, artists may be permitted to enroll and compete in multiple genres or other artistic categories. In certain embodiments, it is possible to create multi-genre categories of the same art form for competition (e.g., a mixed category comprising pop, rock, and soul). DJ's can be included as "artists" by producing their own original mixes, for example, that can include their own production songs or mixes of the songs of others. DJ's may have their own music genre category based on such song mixes.

In other examples, artists can be sculptors and the works of art can be sculptures. Artist sculptors can upload images, videos or three-dimensional graphical representations (which may be viewable in 360°) of their sculptures. Categories can be created based on the materials used such as stone, metal, glass, pottering wood, carving or the technique used or the styles such as, for example, minimalism, modernism, classical, or contemporary, among others. Artists can be painters or drawers, for example, working with paintings and/or drawings. The painters or drawers can upload images, videos, three-dimensional graphical representations (which may be viewable in 360°) of their works of art. Artists may be actors and the works of art can be acting performances or other theatrical or dramatic performances. Artist actors can upload videos of their performances of the parts played in movies, shorts, etc., for example, and compete with these works of art. Categories can be created based on the film genres or can be a mixed category. Artists can be filmmakers or producers who can upload and compete based on shorts they have produced, for example. Categories can be created based on the film genres or can be a mixed category, for example. Artists can be dancers who can upload tracks of their dance performances, for example, as works of art. Categories can be created based on the music and dancing genres, styles or can be a mixed category. Another category could be a song itself, for example, on which dancers create their original dances.

A "voter" account may be provided for general users of the system 102 who do not produce music, for example, or other works of art for competition through the system 102. In addition, a login section 210 maybe provided to allow registered users to access the system 102 (see FIG. 4D). Also, a "hot battles" section 212 may be provided which highlights artist competitions currently underway within the system 102. Competitions may be deemed "hot" based on criteria such as the identity or class of the competing artists, the genre of the artistic work, the number of votes already cast, or many other factors.

Figure 3:
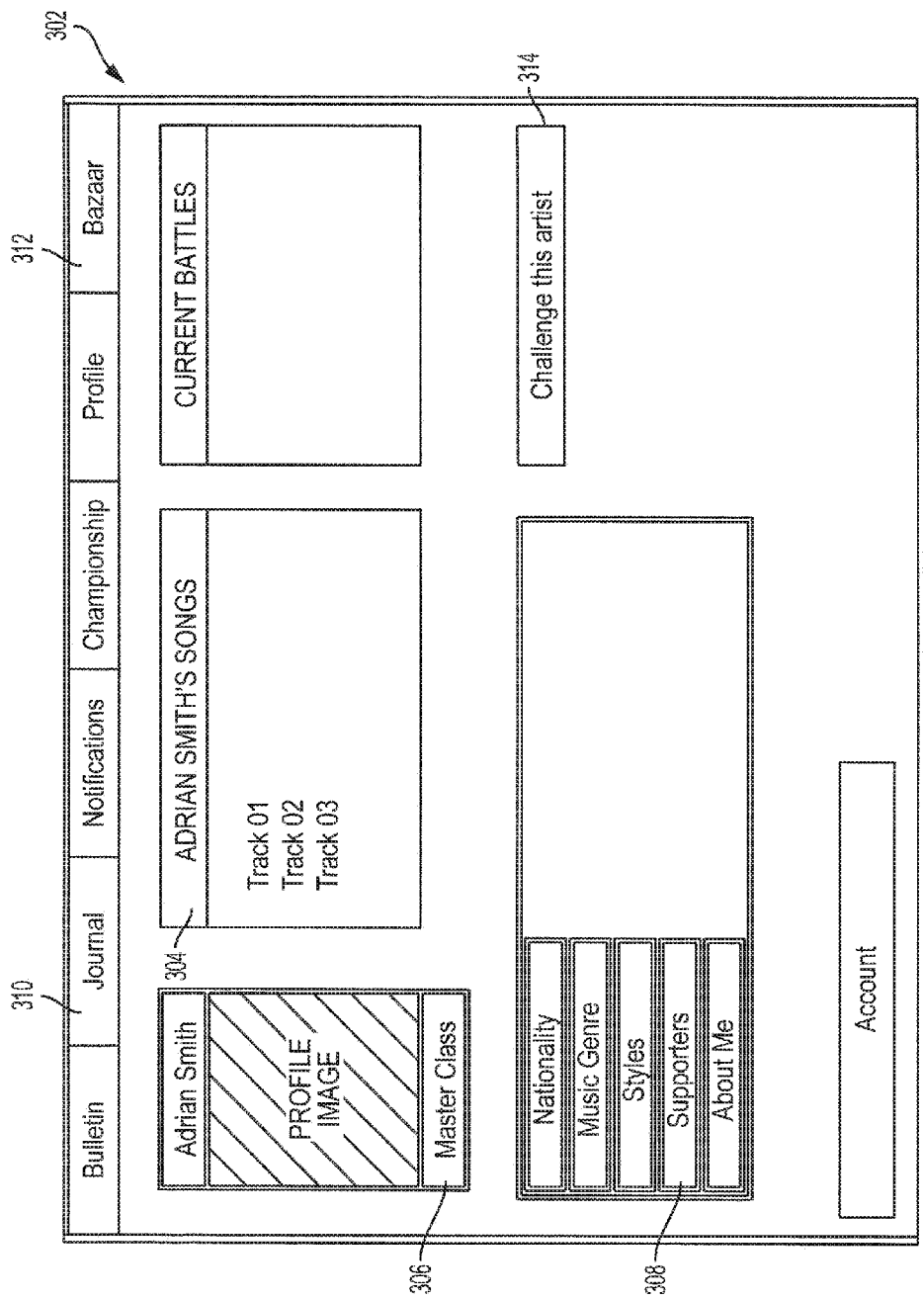
FIG. 3 schematically represents an example of an artist profile structured in accordance with various embodiments of the invention.

In certain embodiments, artists can have access to all user accessible content in the system 102 and may be permitted to vote in battles or competitions. Artists may be included or excluded from certain features such as the artistic intuition module 106D, for example (see below). FIG. 3 illustrates an example of an artist profile screen 302 which may be structured for display by an artist profile module 106B in accordance with various embodiments of the invention. As shown, an artist can load audio/video tracks representing works of art (e.g., musical compositions) into a track panel 304 of the profile. An artist class 306 can be displayed in the profile, wherein the class can be determined in response to a number of points accumulated by the artist by winning a number of competitions, for example. Also, artists can have information about supporters displayed in a supporters section 308, and either artists or voters can become supporters of different artists. The number of supporters may be displayed on the artist profile. Also, information can be displayed regarding voters who are following the artist and/or other artists who are following the artist or visiting the artist's profile. In certain embodiments, artists can access championship and artistic intuition ranking information within the system 102. Also, artists may read or access the contents on the "Journal" section 310, purchase products in the "Bazaar" section 312, and/or perform other activities. In various embodiments, the artist profile may also include a "Challenge this artist" button 314 that permits the artist to propose competitions or battles with other artists.

Figure 4:
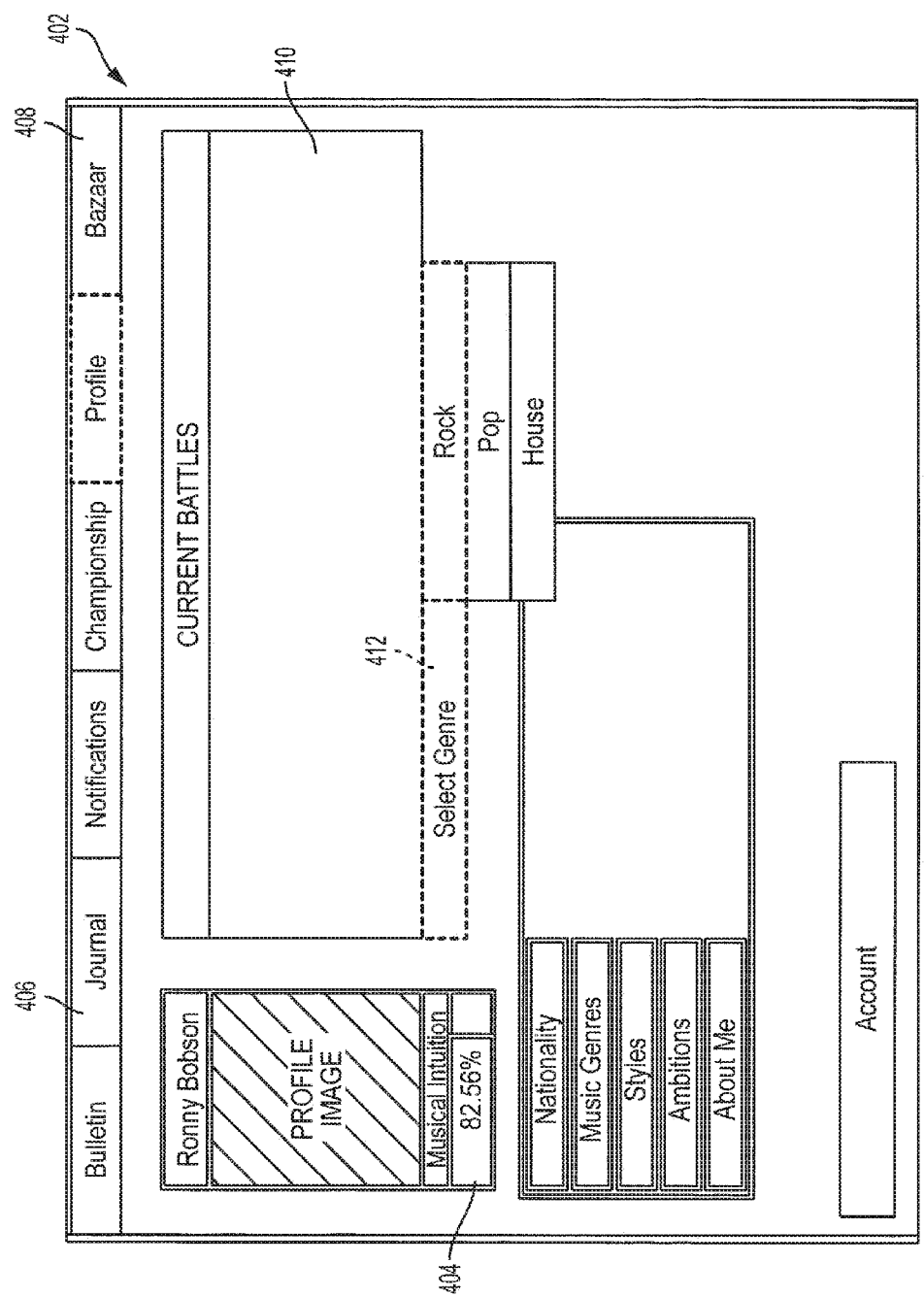
FIGS. 4 and 5 schematically illustrate examples of voter profiles structured in accordance with various embodiments of the invention.

FIG. 4 illustrates an example of a voter profile screen 402 which may be generated by a voter profile module 106C structured in accordance with various embodiments of the invention. A voter can have access to all user accessible content in the system 102 and may be permitted to vote on battles or competitions between different artists. Also, voters can be included as part of the analysis performed by an artistic intuition module 106D and may have an artistic intuition percentage bar 404 included in the profile. The artistic intuition module 106D can provide a mechanism for measuring the ability of a given voter to determine the outcome of a battle. The artistic intuition score may be based on a correct percentage of selecting winning artists for the total battles on which the voter has voted. The artistic intuition percentage can be shown in the form of percentage bar 404 under the voter user profile picture, for example. The bar 404 may proportionally increases from left to right, for example, in relation to decreases or increases in the voter's artistic intuition score. In certain embodiments, the artistic intuition score can be calculated by type of work of art, by genre, by artist, by class of artist, and/or other filtering criteria.

In one embodiment, the artistic intuition module 106D can display rankings of artistic intuition scores in relation to a listing of voters. In one example, an absolute index can be calculated and displayed based on the rankings of voters in association with the artistic intuition score for all categories and rankings together. The rankings can be filtered for each category and/or for each class which a given voter has cast votes. Once a voter votes in a battle of a particular class or category, then the artistic intuition module 106D can add that voter to a list of voters for the particular category and/or class. In certain embodiments, a voter may be permitted to opt into or opt out of the rankings and/or the bar display in the voter profile.

In various embodiments, voters can be permitted to view championship rankings and artistic intuition rankings. Voter users can also vote, read and propose contents to be shown on the "Journal" section 406 and purchase products in the "Bazaar" section 408. In addition, voter profile pages may include a "Current Battles" panel 410 which provides information on battles or competitions currently running in the system 102. As shown, a "Select Genre" button 412 or other functionality can be accessed to sort the battles currently underway by genre of music, for example (rock, pop, house, etc.).

Figure 5:
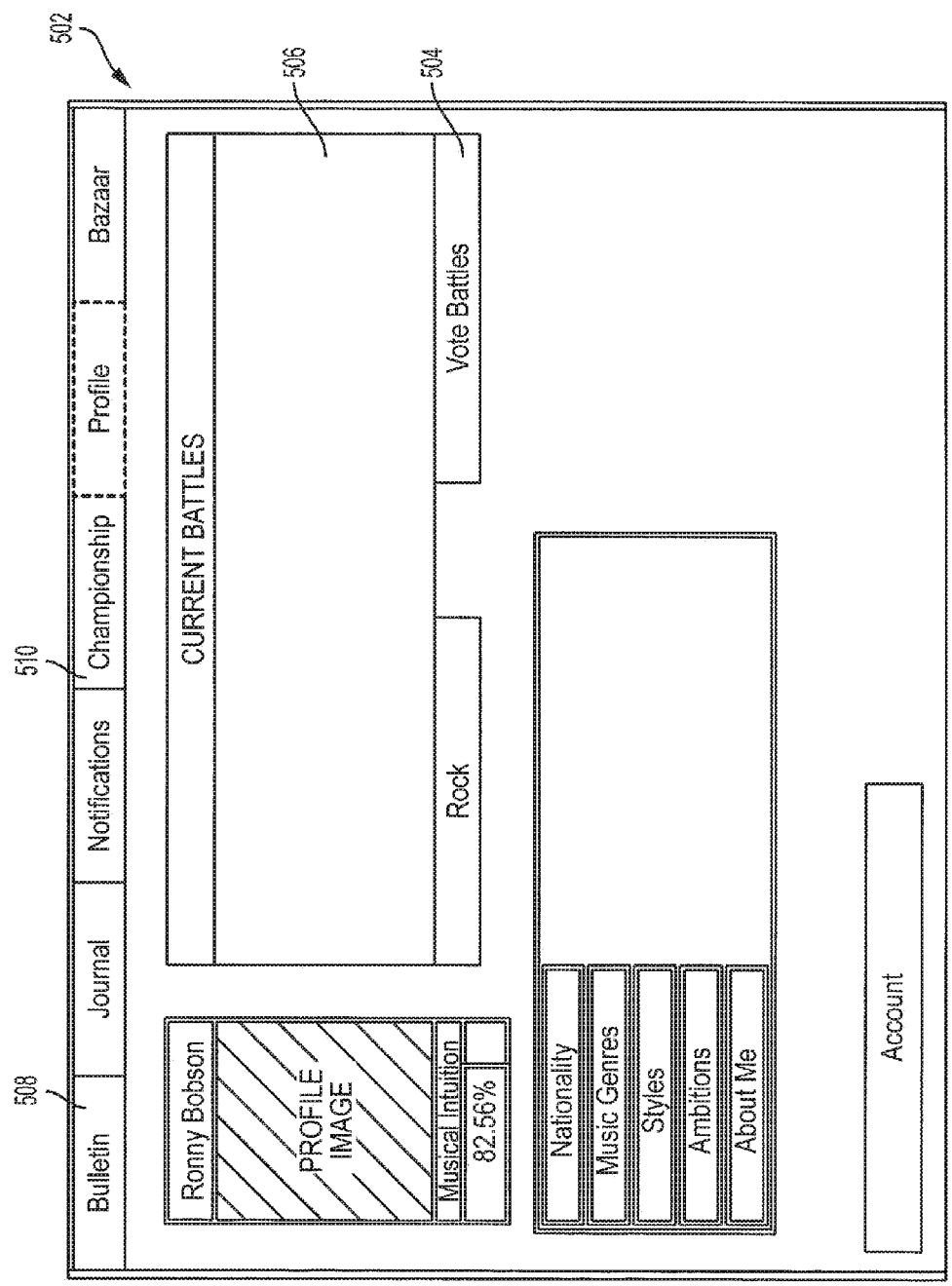
Figure 6:
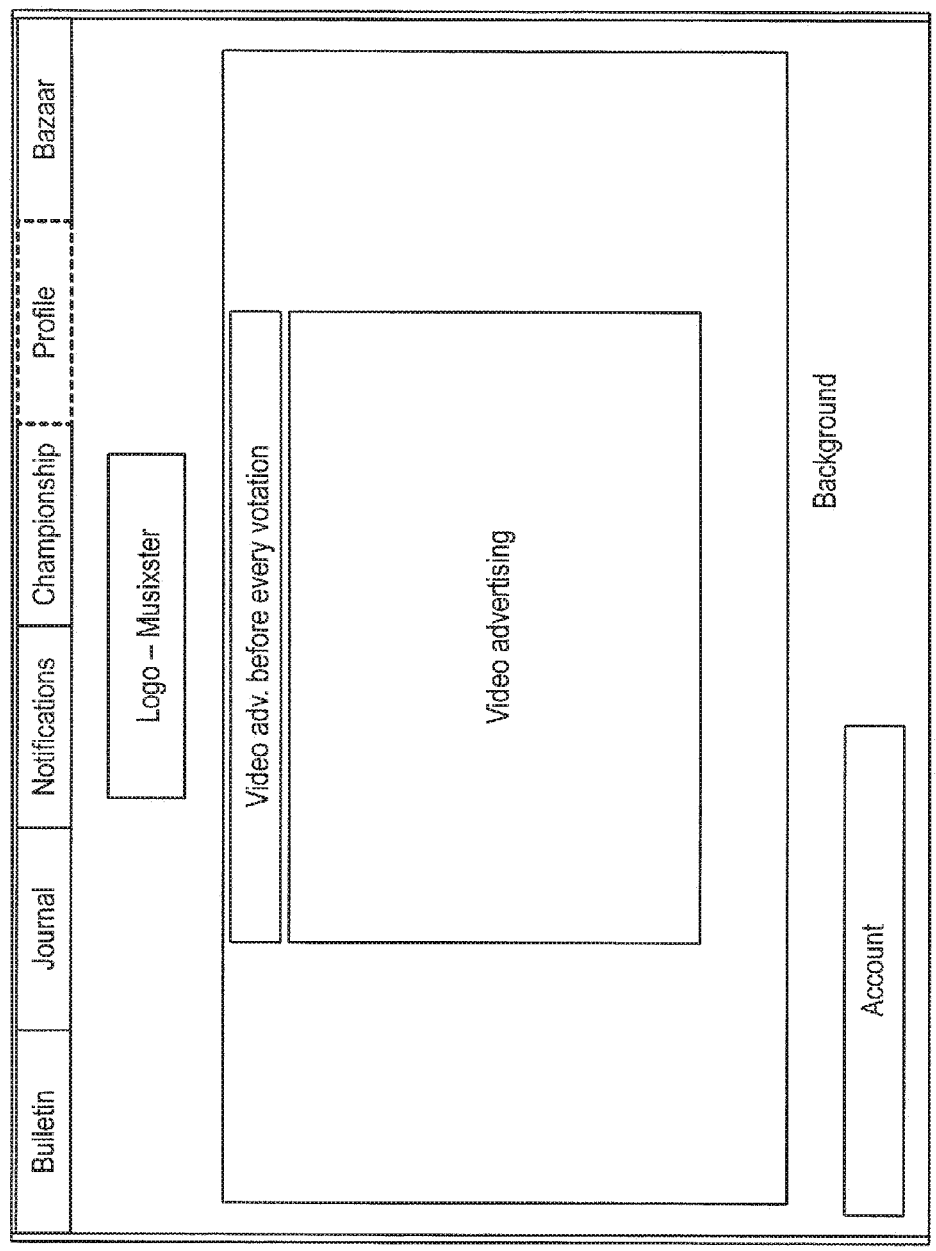
FIG. 6 schematically illustrates how advertising content can be displayed to users through a social network system structured in accordance with various embodiments of the invention.
Figure 7:
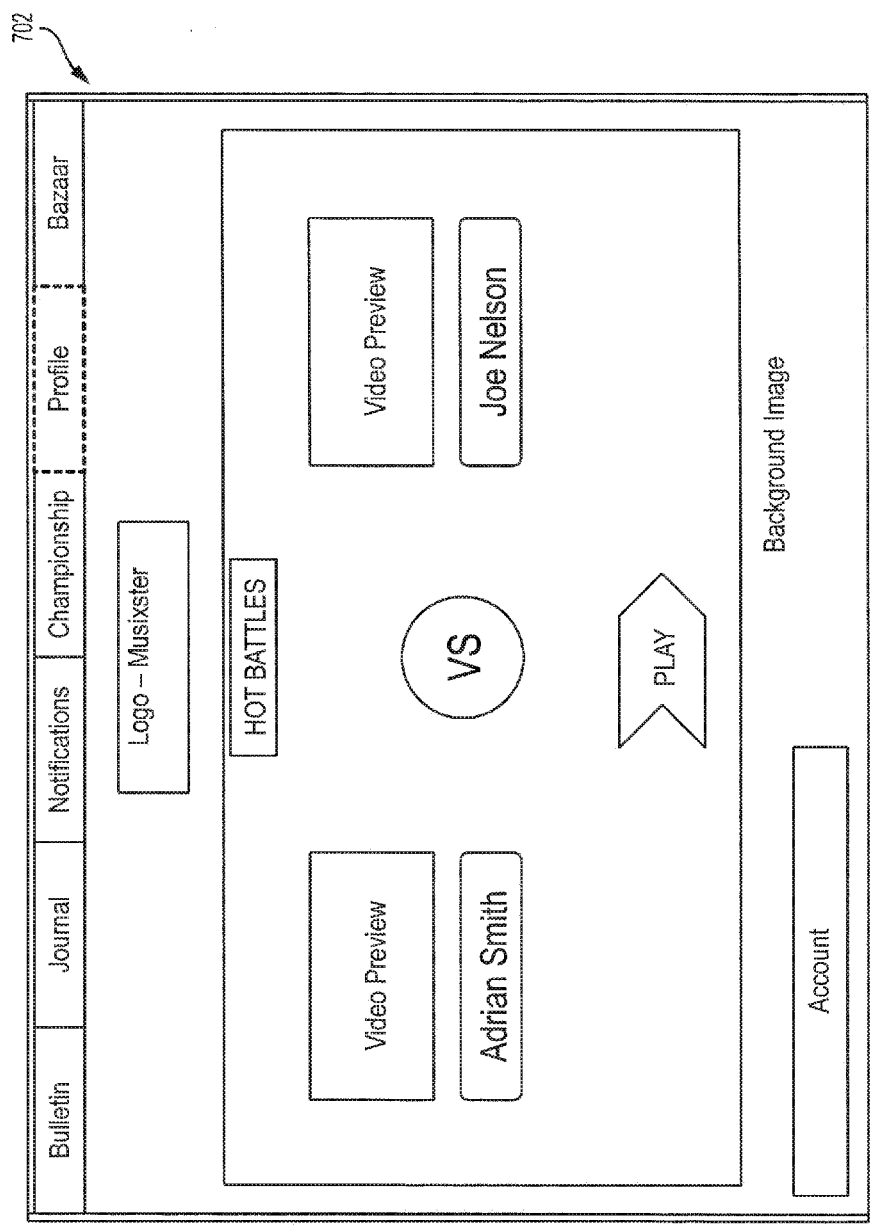
FIGS. 7 through 12 include examples of screen displays that can be presented to voters during a voting process of a social network system structured in accordance with various embodiments of the invention.
Figure 8:
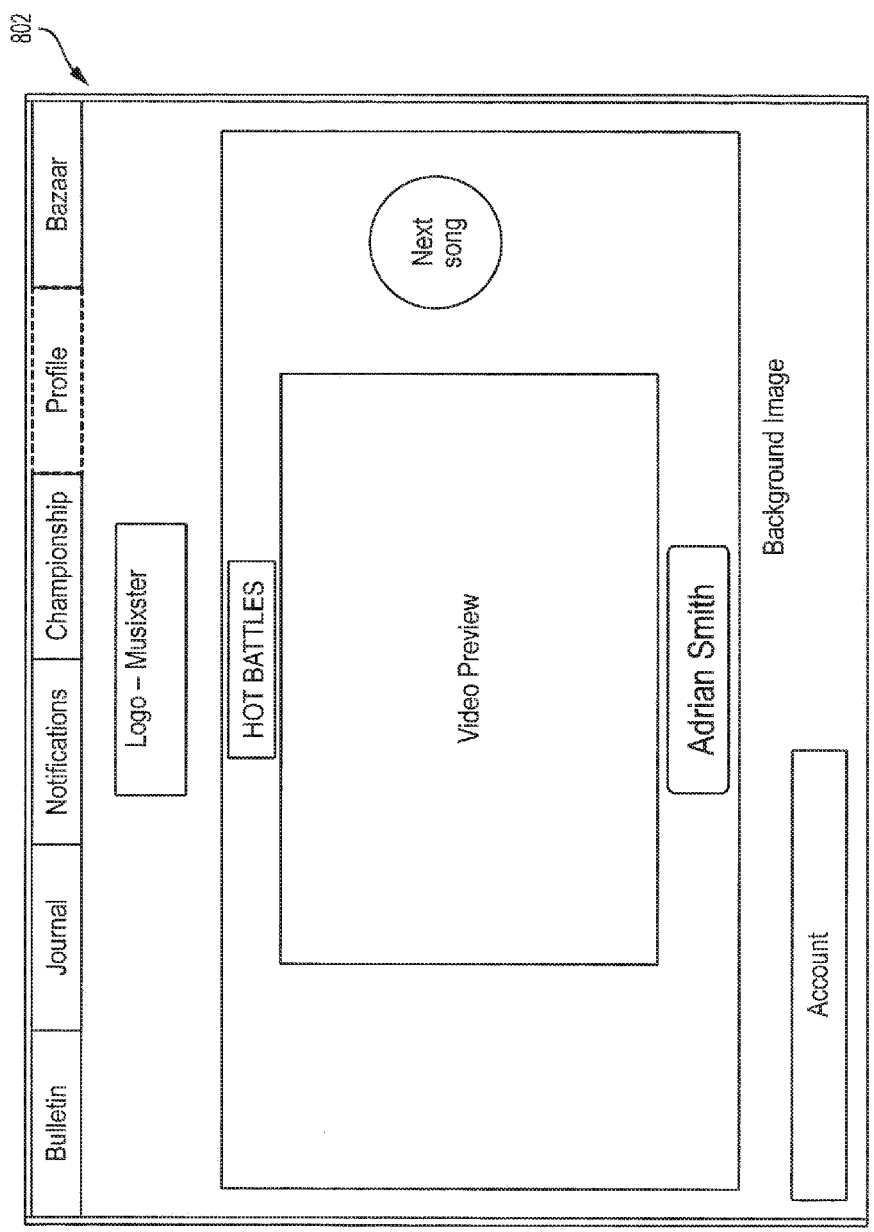
Figure 9:
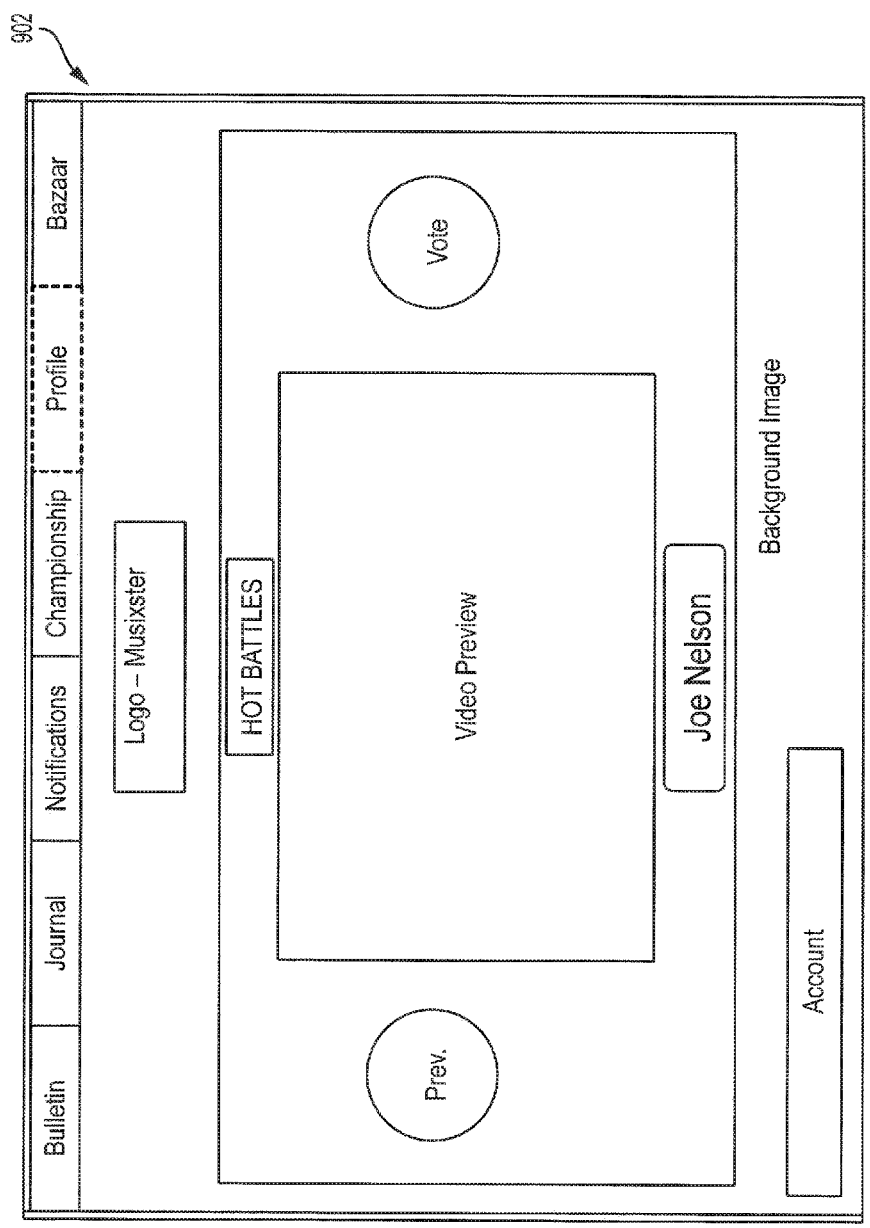
Figure 10:
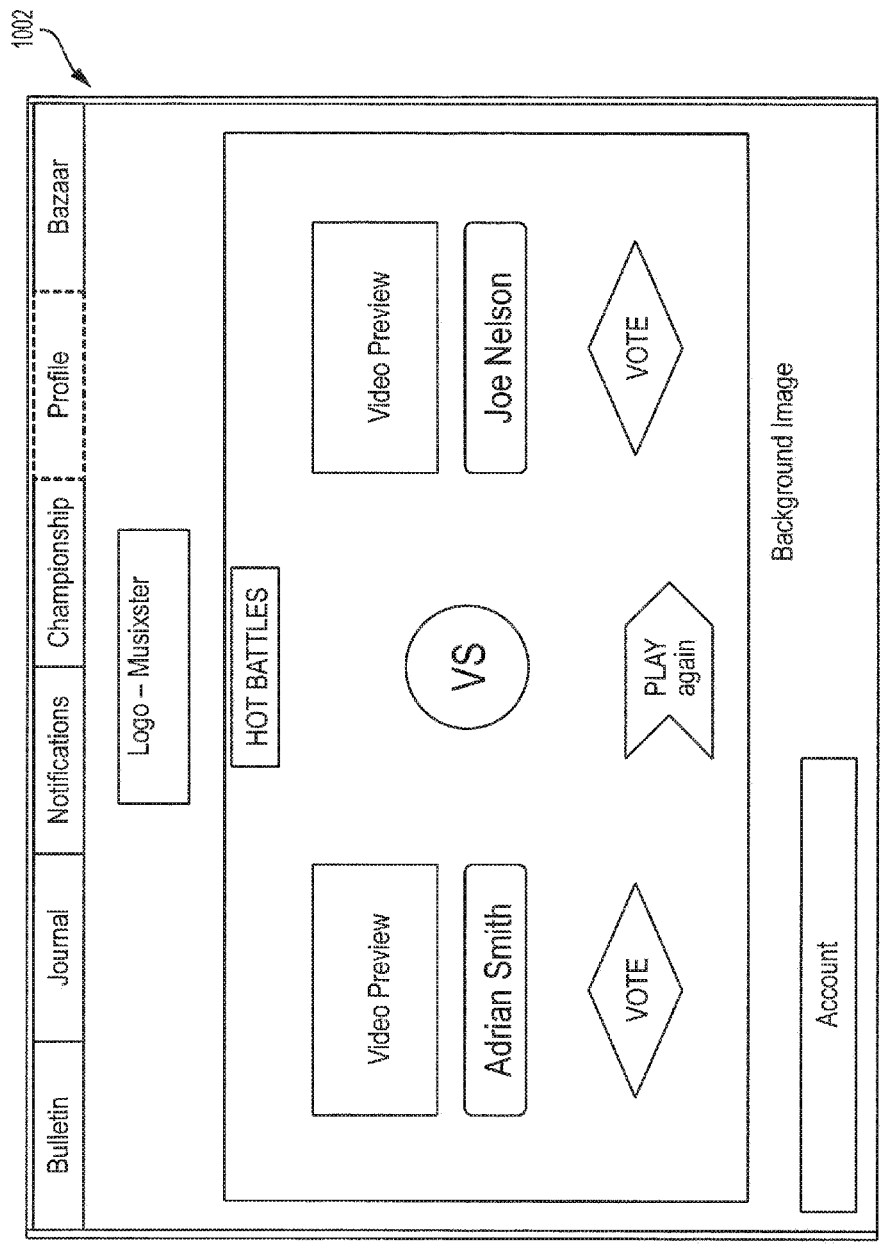
Figure 11:
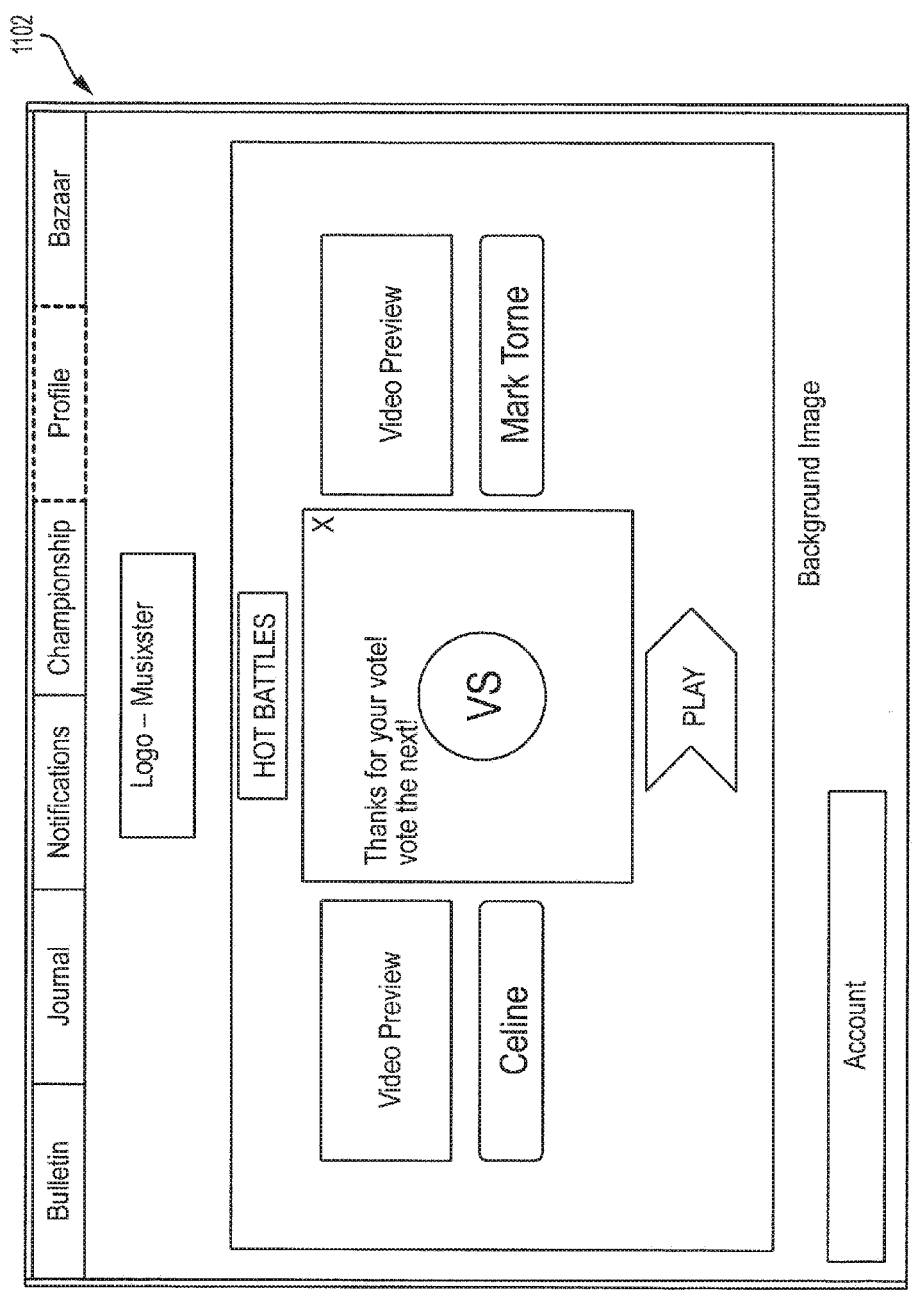
Figure 12:
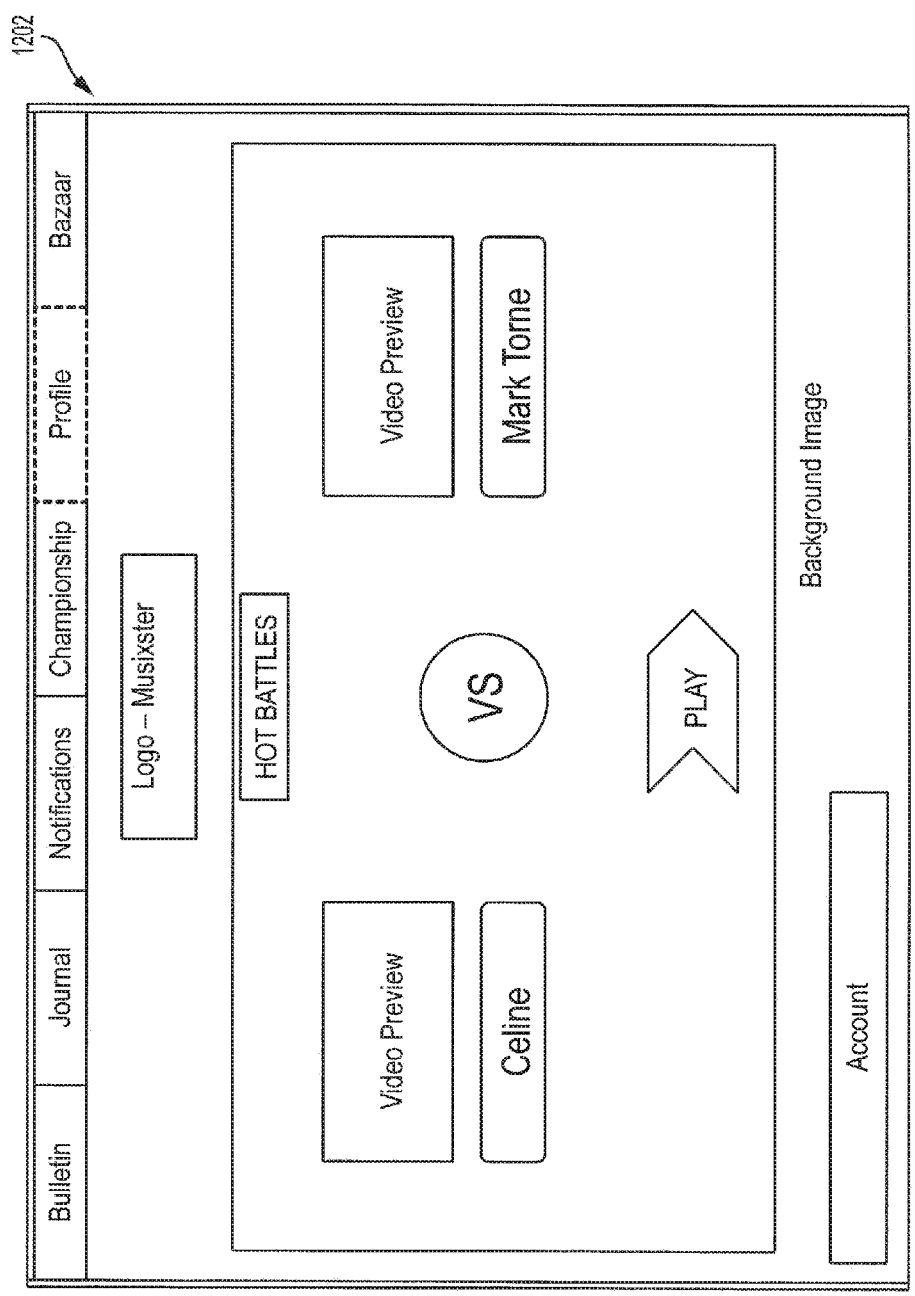

FIG. 5 includes an example of a voter profile screen 502 which includes a "Vote Battles" button 504 for accessing a battle module 106E of the social network system 102. The battle module 106E may be programmed to display one or more current battles to the voter for which votes can be cast. In various embodiments described herein, the act of casting a vote, for example, may be considered a species of the general concept of communicating an "indication of preference" which expresses a preference for one artist over another artist, or a preference for a work of art associated with one artist over a work of art associated with another artist. The battle module 106E may select battles at random from among all battles, or at random from among a particular genre or championship class selected by the user, for example. In other embodiments, the voter may specify a music genre for voting battles, for example, on the "Current Battles" panel 506. In certain embodiments, the voter can cast votes for battles appearing on the "Bulletin" section 508. The voter may also be permitted to vote in battles displayed in one or more league tables accessed through a "Championship" section 510 of the profile (see below). FIG. 6 includes an example of advertising content that can be displayed to a voter in association with the voter initiating the process for casting a vote for a battle. FIGS. 7 through 12 illustrate examples of how a voter can access and preview various battles that can be conducted through the system 102, including activating video previews, for example, of works of art involved in the battle. As shown, the system 102 may provide an audio/video track management bar including play/stop button, for example. Also, a direct link to the next vote may be provided such that once the voter has voted for a preferred artist, then a new battle page can be opened automatically thereafter.

In various embodiments, a voter may express an indication of preference for one artist over an opponent artist by casting a vote positively in the artist's favor, for example, or by casting a vote negatively against the challenger. In certain embodiments, when a vote is cast negatively, the artist receiving the negative vote may receive a negative vote for his vote total, for example. In one embodiment, the voter may be permitted to cast votes for both artists to reflect that the battle is a draw or a stalemate in the voter's opinion. In another example, casting a vote for a preferred artist can award the preferred artist a vote while subtracting a vote from the non-preferred artist. In certain embodiments, the ability to simultaneously award and subtract votes may be provided, for example, to voters who have achieved a certain artistic intuition score or ranking, who have voted in a predetermined number of battles (e.g., 1000 battles), or may be limited to certain voters who vote within a predetermined work of art genre, among other criteria that might be applied.

In various embodiments, battles may be conducted until a predetermined number of votes cast by voters is attained, for example. The battles may be conducted on a time basis, on a vote quantity basis, or on a reasonable combination of vote quantity and time duration. A display of current battles may be generated in response to random selection; in response to battles which have the most votes cast; in response to battles that have the least votes cast; in response to battles that are being voted most of all genres; in response to the best of genres coupled together in relation to the class; and/or, in response to ranking in the class of one or both contestants involved in the battle. In certain embodiments, the system 102 may select a genre for displaying information related to battles or the user may specify a genre of interest.

In other embodiments, a weighted system for currently running battles may be programmed for continuously analyzing current battles and detecting how many votes every battle has received. The battles may be ordered on a scale from the battle that has received the least number of votes to the battle that has received the most number of votes. The scale can also be implemented with a percentile measure and a percentile rank. In another example, a system of quotas can be set to establish in what quantity the current battles are to be shown. The quantity can be expressed in any value such as, for example, percentage or numerical. In certain embodiments, quotas can represent a ranking for the battle as a single percentile, a group of percentiles, or on an absolute scale. In another example, a quota system can be implemented which determines a quantity of battles belonging to a specific class to be shown. In another example, a quota system can be based on time and quantity limits of the current battles. The system can generate a scale in response to how long a battle will last and/or how many votes the battle needs to be declared finished. The weighted quota system can be combined with one or more aspects of other quota system with any order of precedence. In certain embodiments, displays of running battles (including an interactive panel for voting) can be implemented in streaming mode.

In various embodiments, a ranking module 106F may be provided for determining classes and/or championships for various artists within the same genre, for example. Each genre may have its own championship (e.g., a genre championship), for example, and genres can be added to or deleted from the system 102. Each genre championship may be subdivided into different classes, and a sub-championship may be played in each class (e.g., a class championship). In one example, a newly registered artist may start from the lowest class and with no points. The artist may be permitted to fight only against another artist of the same class. Each class championship may be represented by a league table determined by the results of various battles or competitions. It can be seen that the ranking module 106F may be programmed to determine an ordered ranking of different artists within each class, such as by a quantity of points accumulated by the artists, for example. A victory quota may be predetermined as a number of points required for an artist to be promoted into the next class championship, for example. Once an artist attains a victory quota, that artist can be automatically moved into the next class championship level. The highest class an artist can attain may be the "Master Class" level wherein the "Master Championship" is played. The artist currently ranked first in the Master Championship may be awarded a "World Champion" title. When an artist is promoted to a higher class, the artist may retain a current number of points previously earned, and this number of points can be used to promote and demote the artist, as appropriate, between different championship classes. The determination of a champion can be subject to a time limit, such as an annual or seasonal selection of the champion, for example.

In various embodiments, artists that achieve first place in the master class can be selected to have one or more of their art works placed into a compilation, perhaps for commercial sale. This may involve creating compilations selecting the best works of art, organizing tours with selected artists, engaging selected artists for the marketing of one or more of their art works or their entire portfolio, and/or engaging selected artists for the creation of new artistic productions.

In connection with operation of the battle module 106E, each artist can be provided with a number of tracks that can be used to engage in a battle (see above, e.g., FIG. 3—track panel 304). The artist can upload an audio/video track of a musical composition or other work of art into each track, for example, as a representation of the work of art. The artist can use the tracks to challenge another artist or to be challenged by another artist. There may or may not be limits on: the number of tracks made available to an artists; the quantity of tracks a user can upload; tracks to be used contemporaneously to fight battles; and/or tracks to be used for battle (e.g., it is possible to limit a track to a predetermined number of battles). In other embodiments, tracks may be designated for use on a temporary limit basis (e.g., it is possible to specify that once a track or element is used, the track or element can only be used again after a number of days and/or a number of battles). In another example, if a specific track or element has won a battle for the user, then the user may be permitted or not permitted to continue to use the track or element for the next predetermined number of battles. Likewise, in another example, if a specific track or element has lost a battle for the user, then the user may be permitted or not permitted to continue to use the track or element for the next predetermined number of battles.

In various embodiments, users visiting an artist profile can be permitted to access and play representations of works of art on the artist's loaded tracks panel. In another example, access to the loaded tracks panel can be restricted to certain users. In another example, only voters can see and access the tracks panel, while other artists may not be permitted to do so. When playing tracks on the tracks panel, the whole track can be executed or just a sample or preview. The track execution can include a scroll bar, for example, to allow the user to jump to anywhere in the track (back and forward), or to make it finish by moving the scroll bar to the end. These features can be applied during voting for battles as well as when a user accesses an artist profile.

Figure 13A:
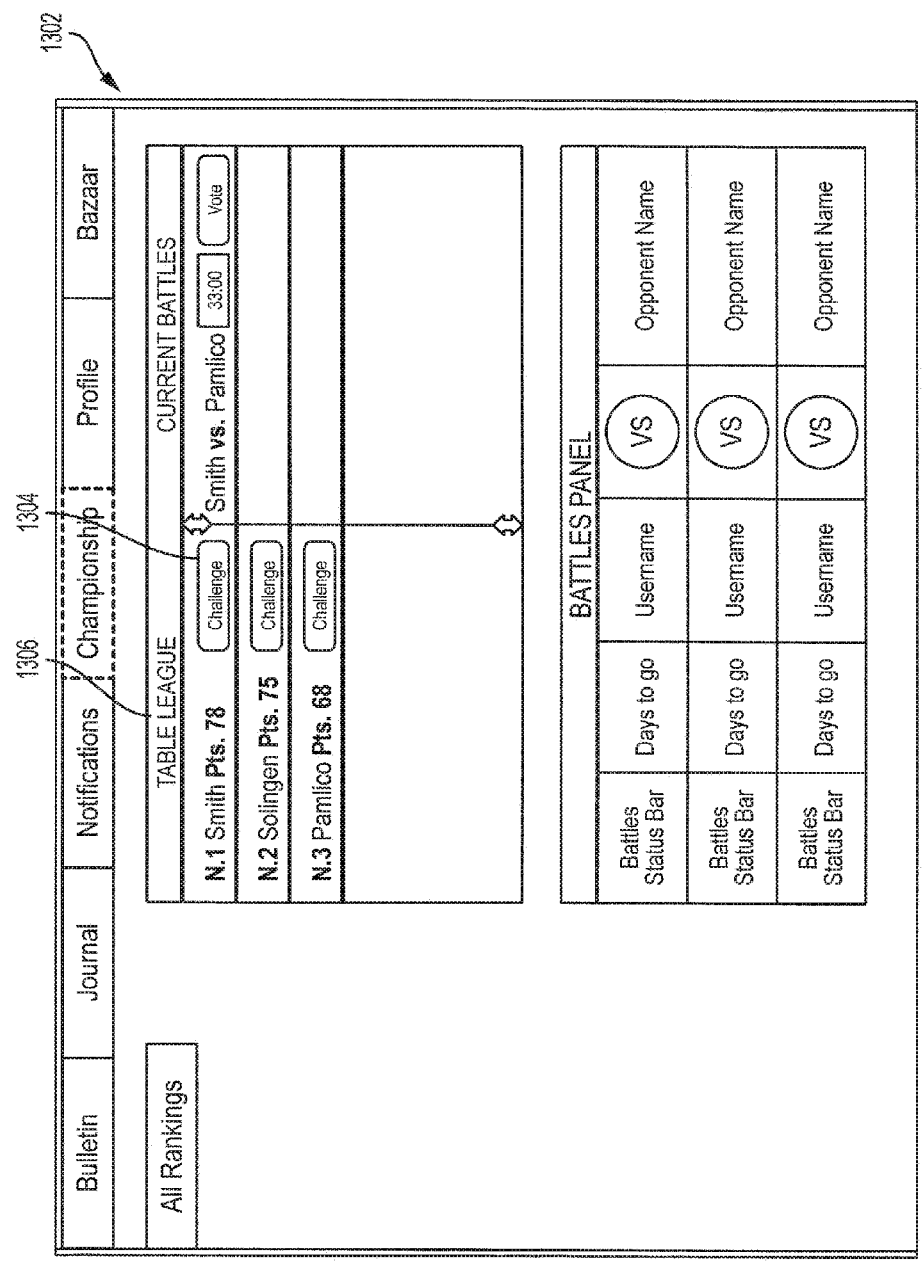
Figure 13B:
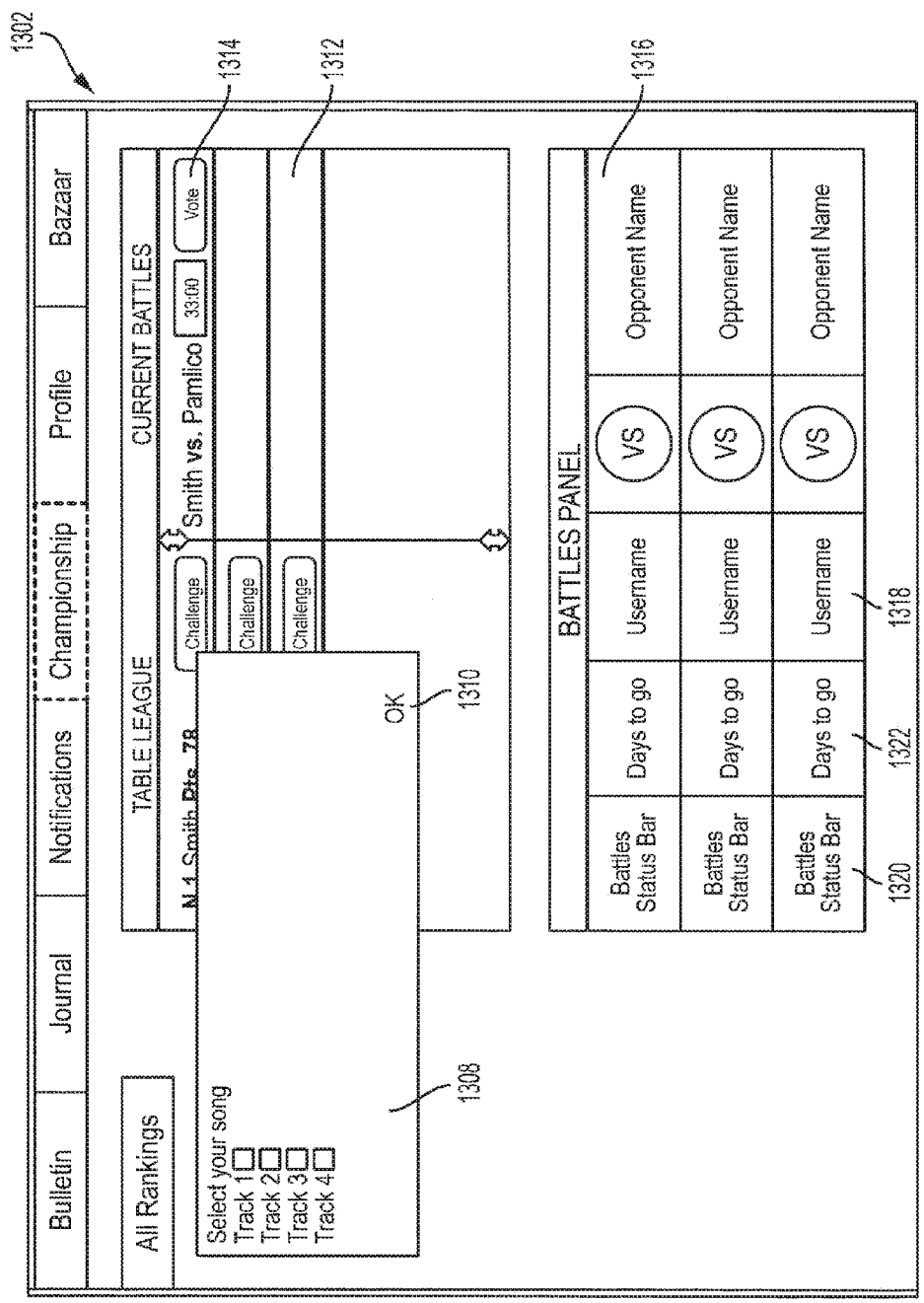
Figure 13C:
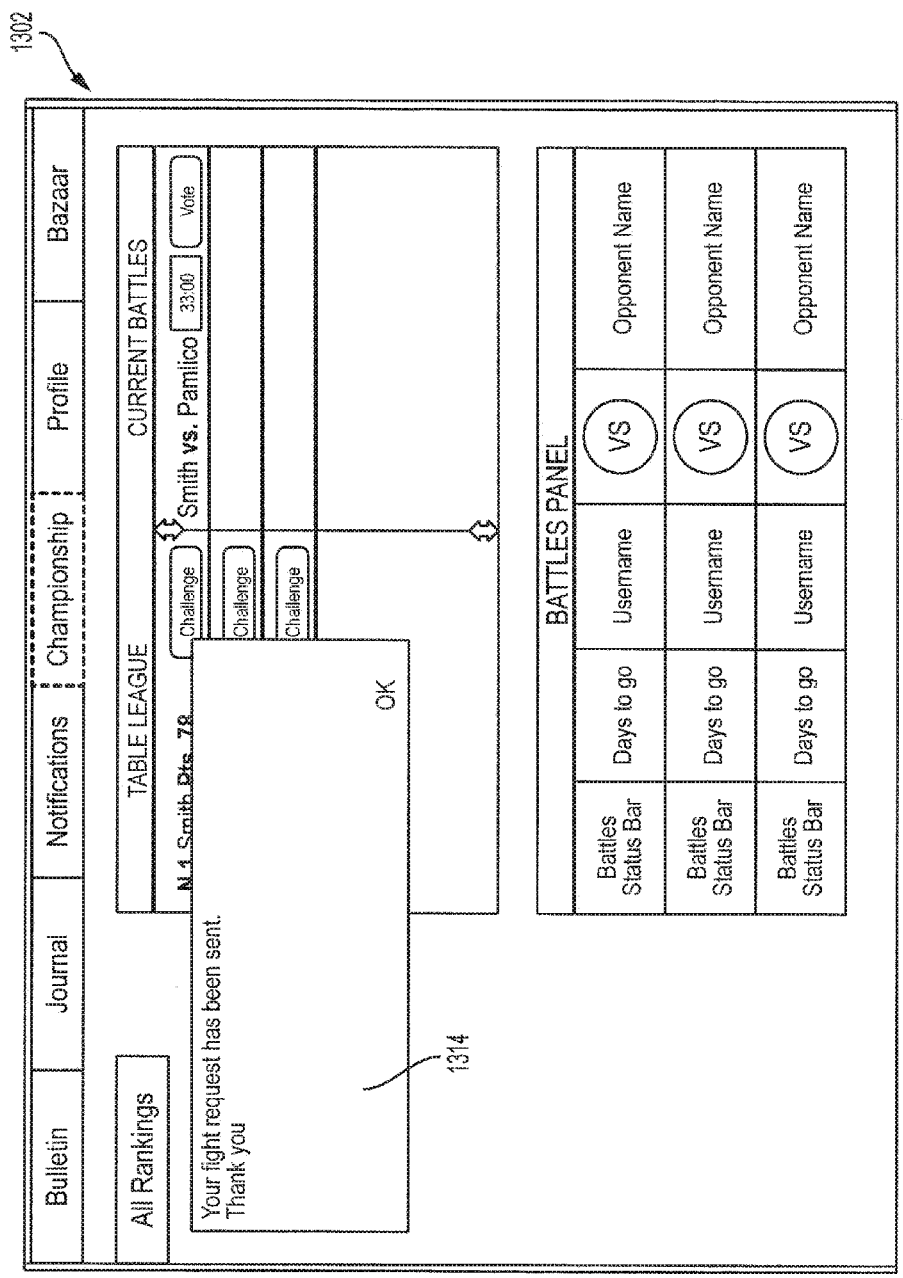
Figure 14:
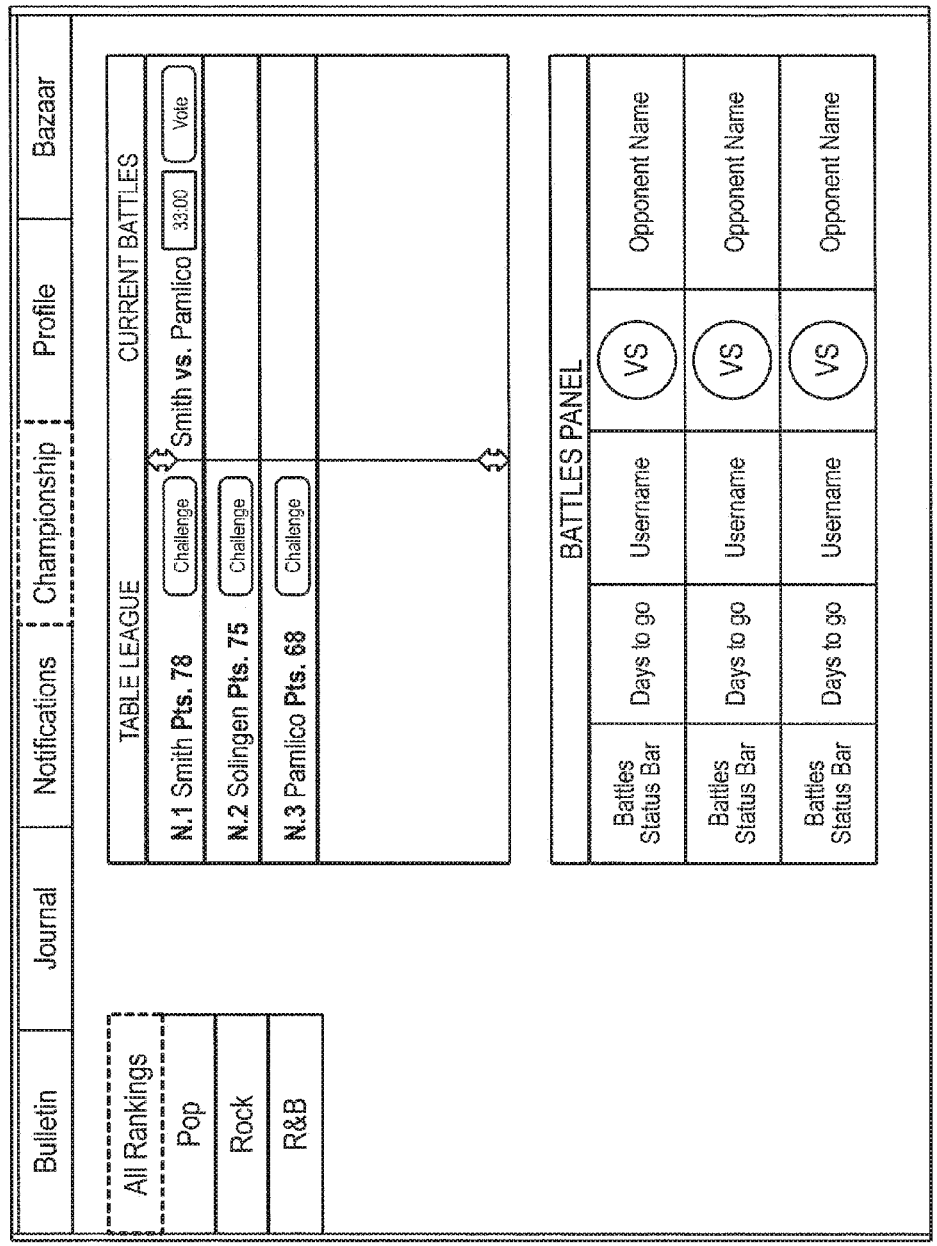
Figure 16A:
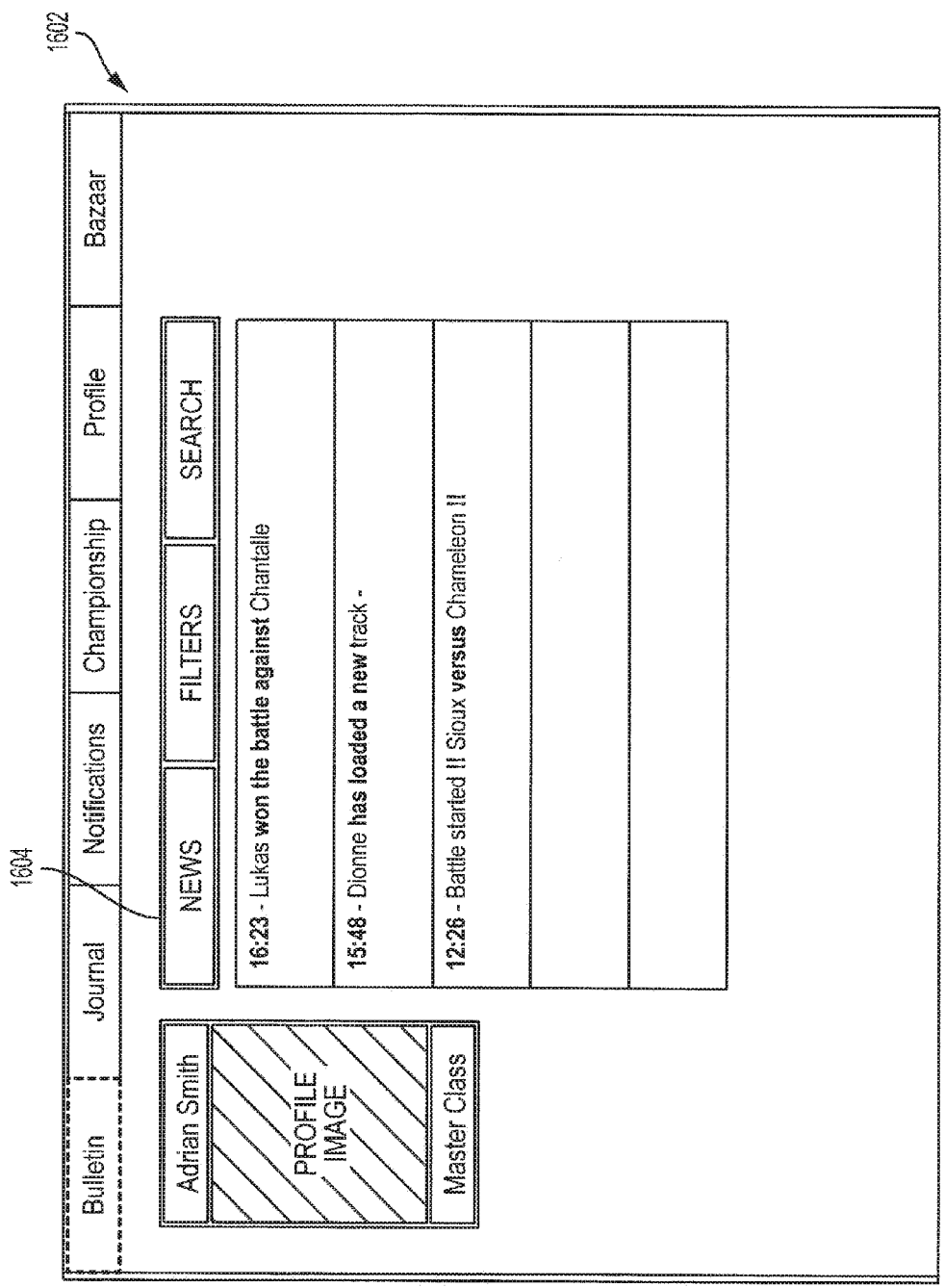
FIGS. 16A through 16G include examples of screen displays that can be displayed to users in a bulletin section of a social network system structured in accordance with various embodiments of the invention.
Figure 16B:
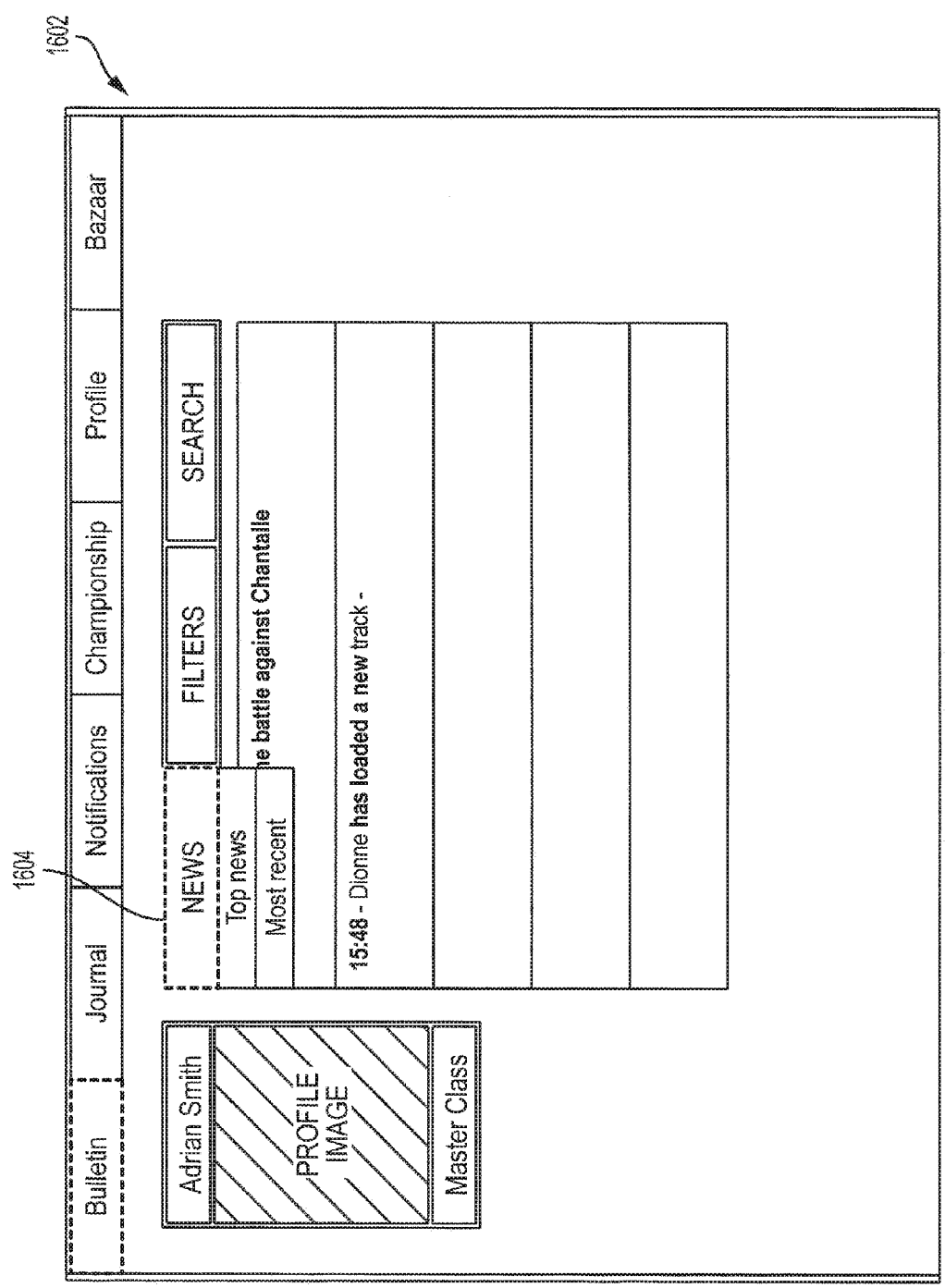
Figure 16C:
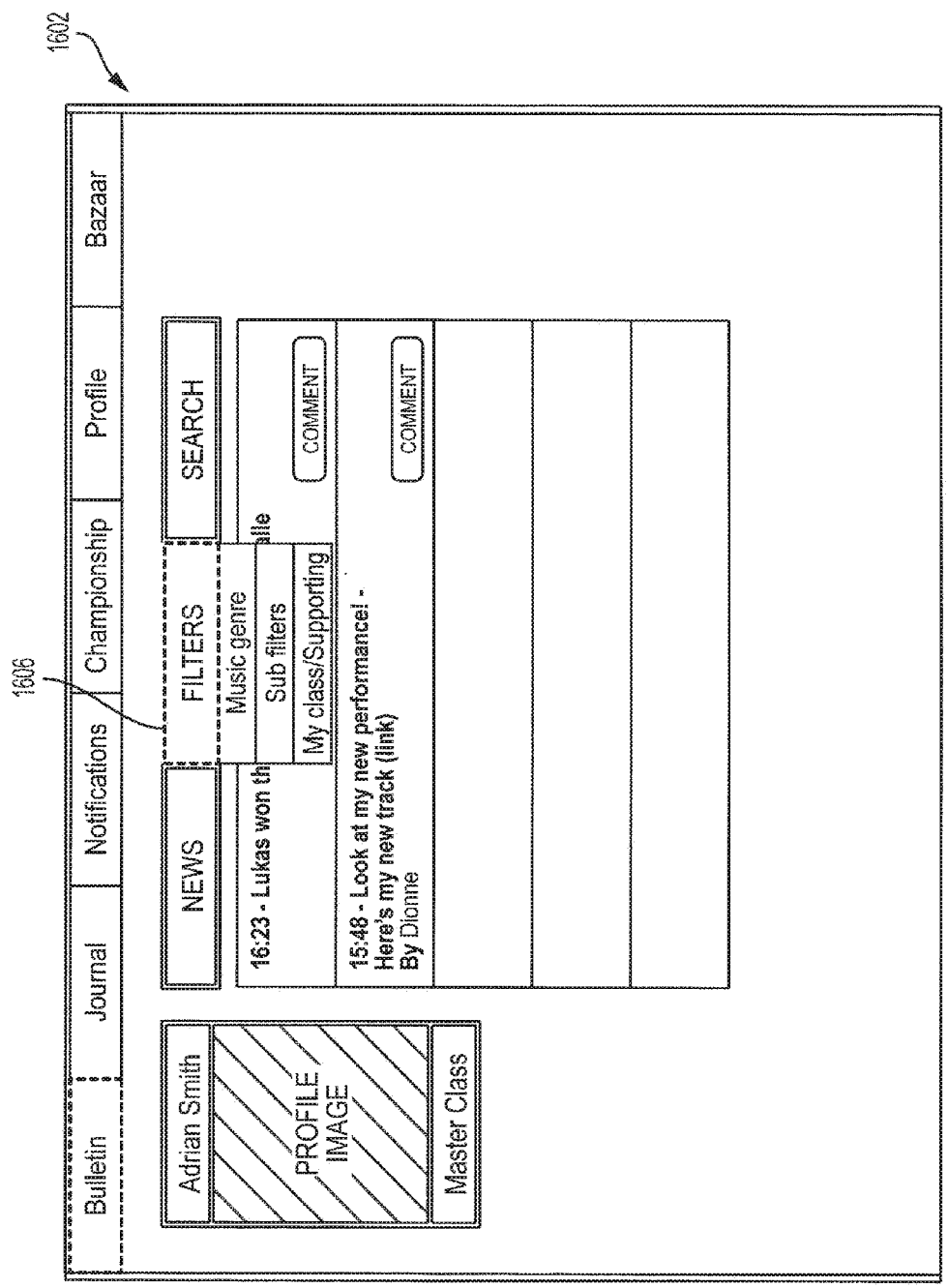
Figure 16D:
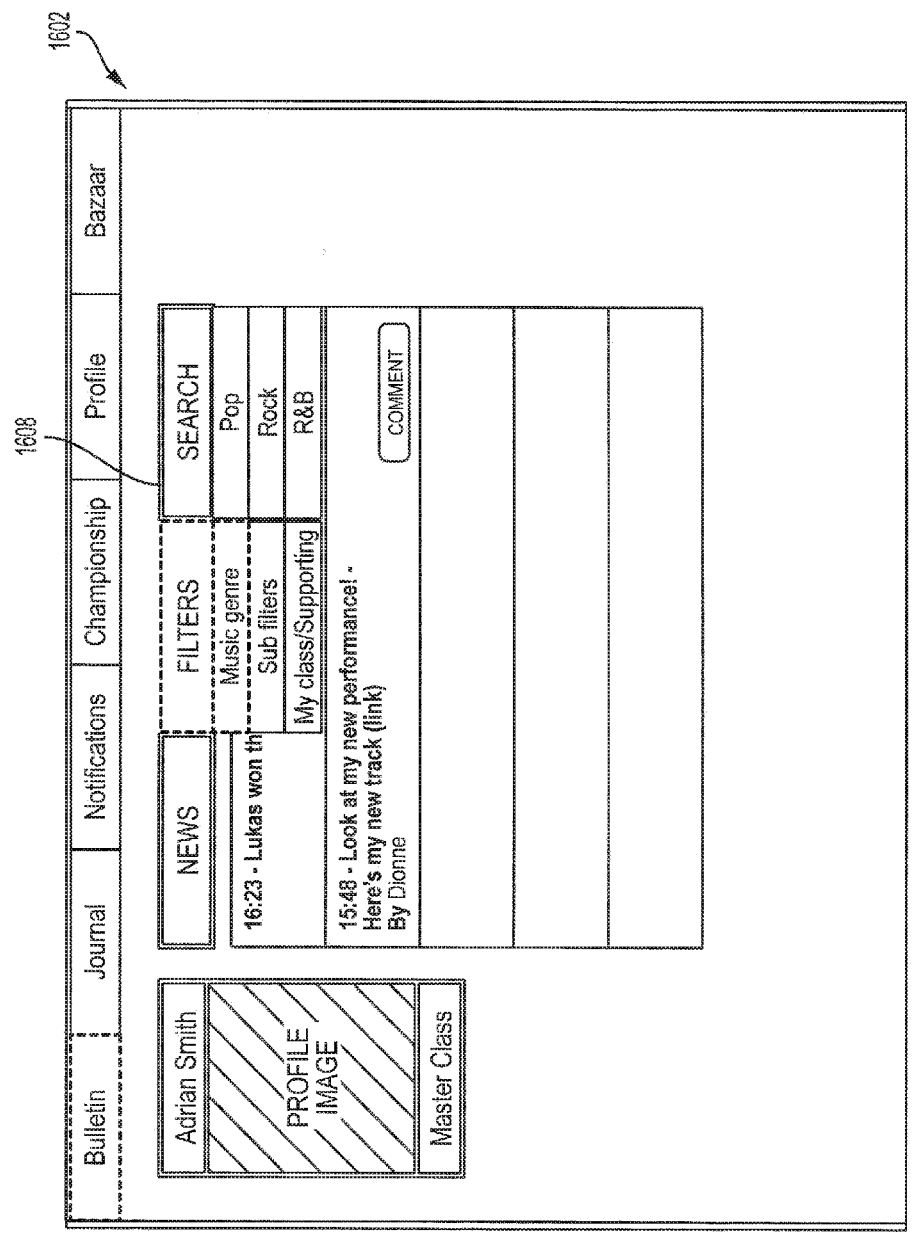
Figure 16E:
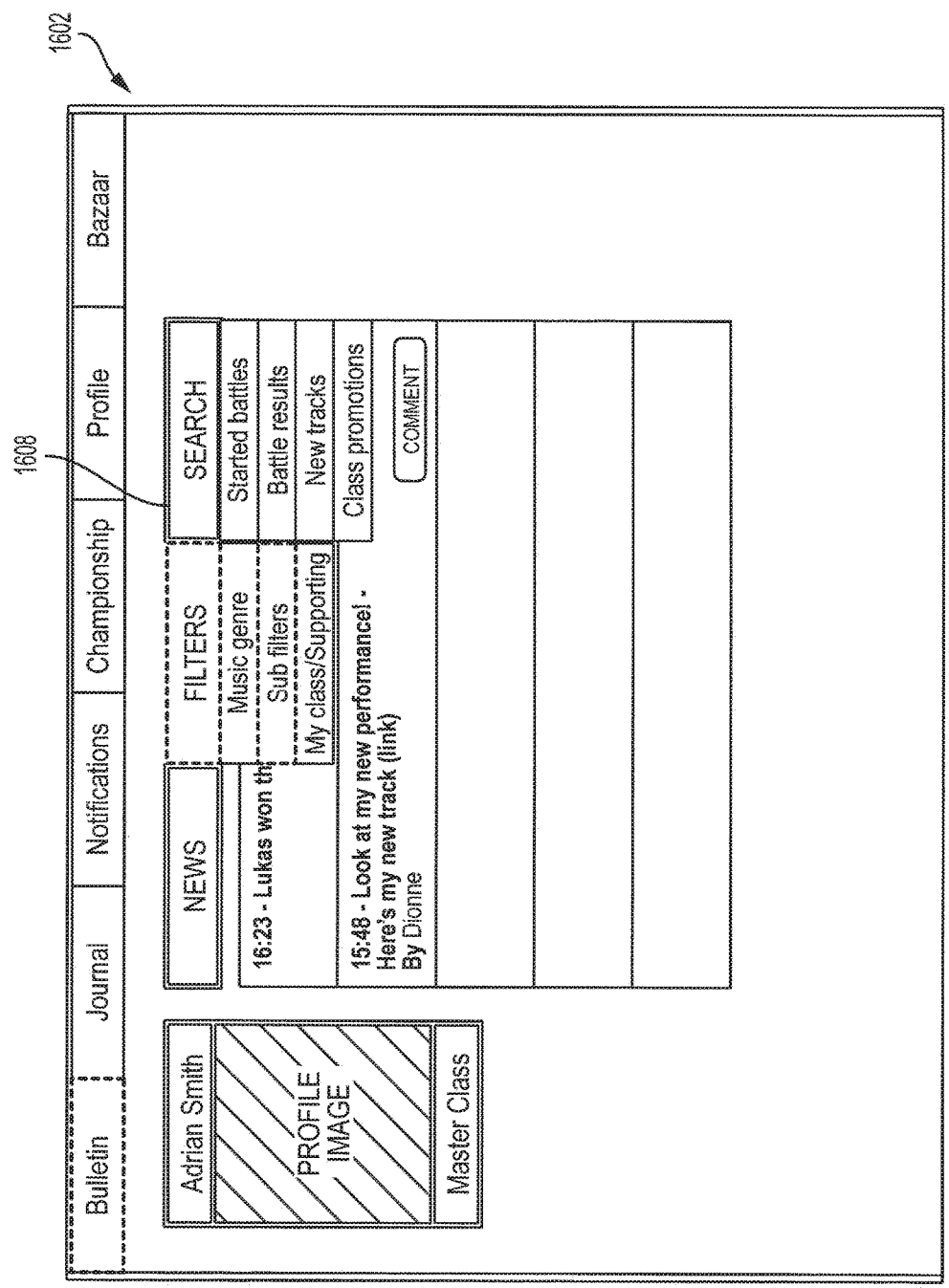
Figure 16F:
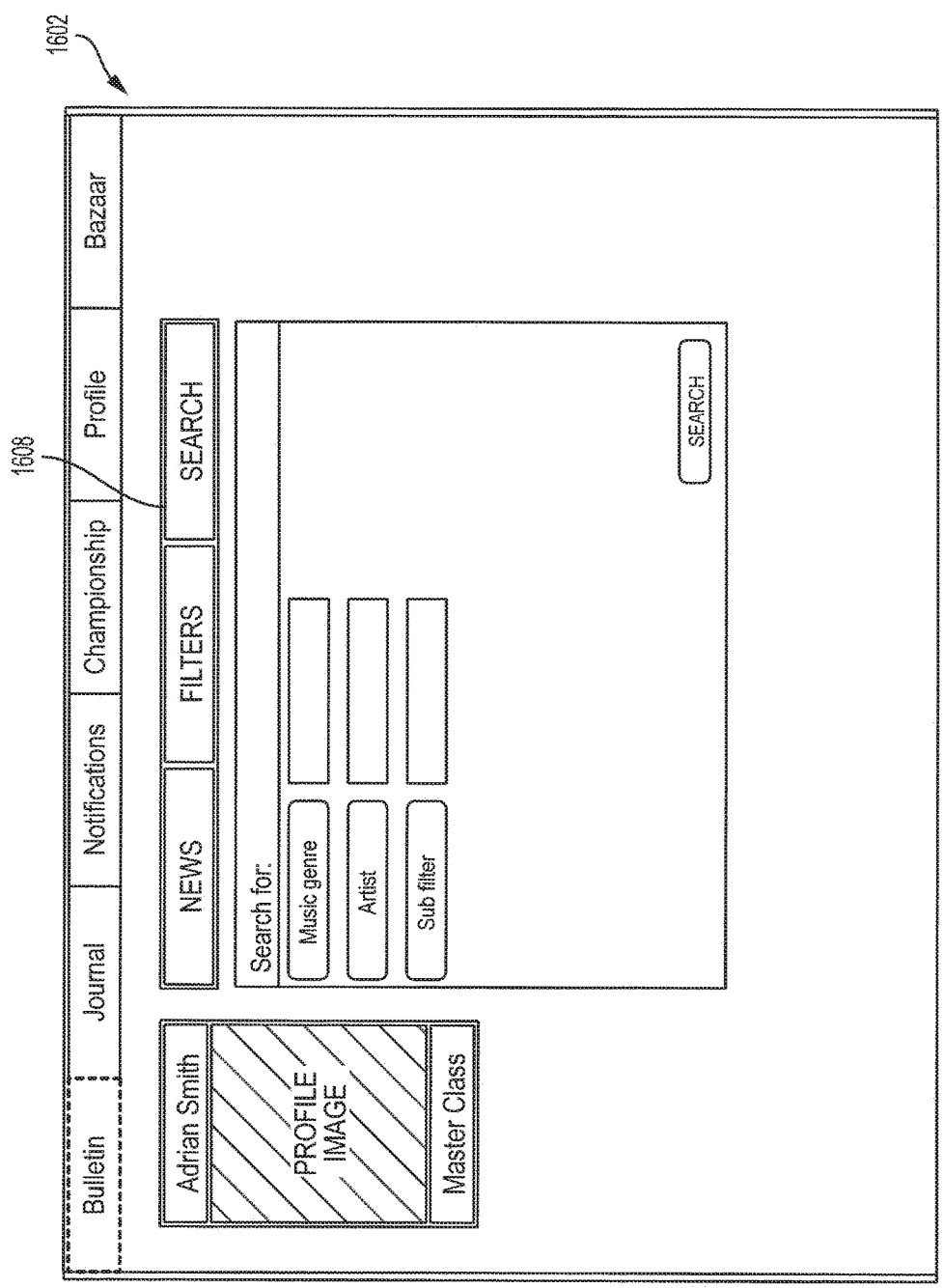
Figure 16G:
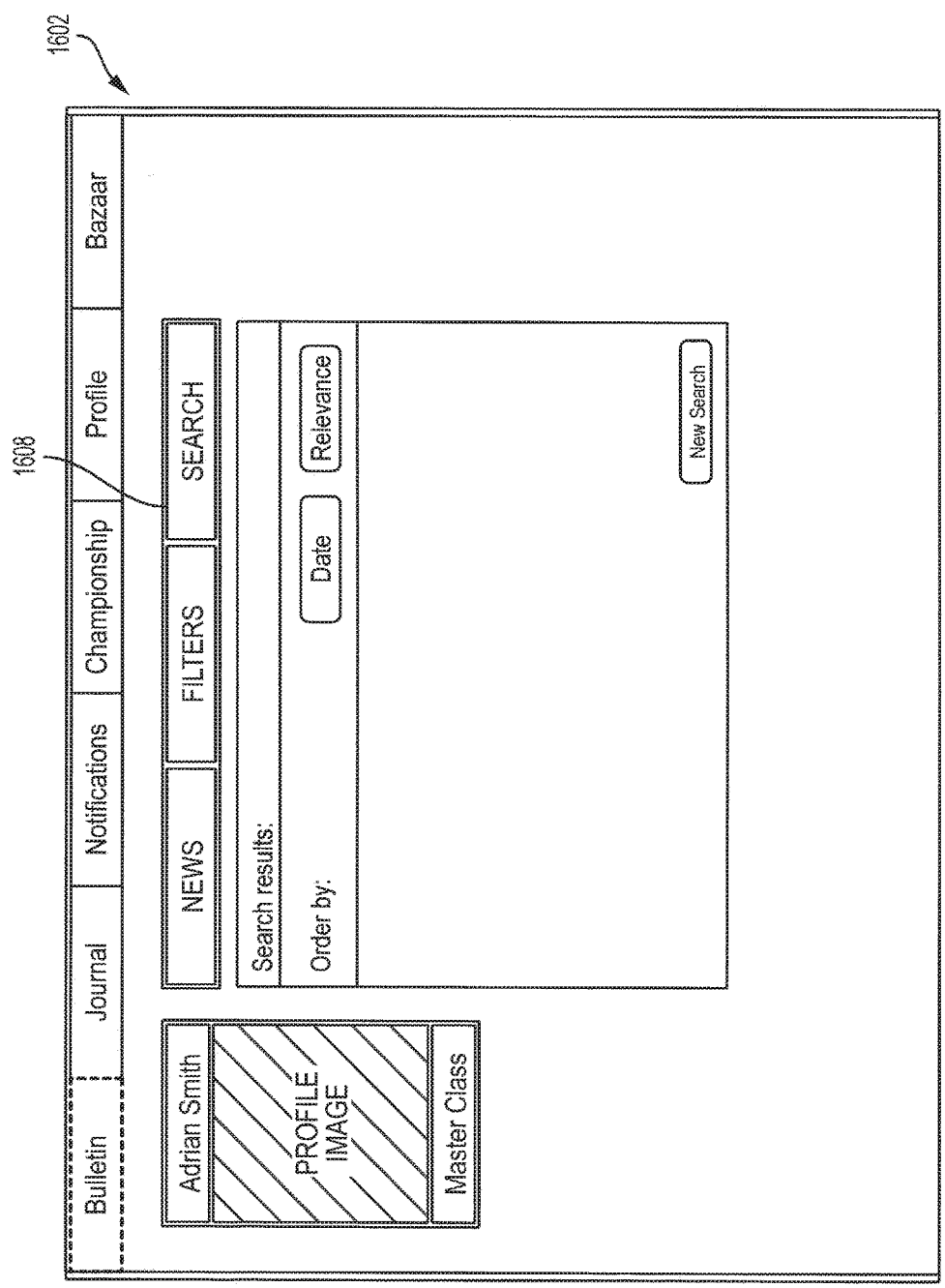

With reference to an example of a battle screen display 1302 shown in FIGS. 13A-13C, in one embodiment a challenger may click on the "challenge" button 1304 next to the artist name in the championship league table 1306, for example, to fight against an opponent. A window 1308 may be opened for selecting which track to use to fight the selected opponent. Once the user clicks the "OK" button 1310, then the battle will appear on a current battles panel 1312 and a fight request notification 1314 can be communicated to the desired opponent. As shown, information in the current battles section 1312 may include class championship ordered chronologically, names of the artists of the battle, and time (e.g., days or hours) until the battle ends. In one embodiment, a scroll bar and "vote" button 1314 may be provided next to each current battle allowing voters to vote for that current battle. In another embodiment, a battles panel section 1316 may display a user name 1318 linked to a profile associated with the user name 1318. A status bar 1320 for each battle may indicate whether a battle is pending or in progress, for example. Also, a "days to go" bar 1322 may indicate the time remaining until a battle is over. FIG. 14 includes an example of how different artists can be sorted and displayed by genre (e.g., rock, pop, R&B, etc.). FIG. 15 includes an example of how different classes within the same genre can be selected (e.g., master class, second class, third class, fourth class, etc.), and a league table can be displayed for the selected class, for example.

Once a challenge has been submitted, the challenged opponent may have a predetermined time period (e.g., a number of hours or days) to answer the challenge. If the opponent agrees, then the battle starts and the challenger may receive one point, for example, through a scoring module 106G. If the opponent refuses, then the challenger may receive one point and the slot may be available for a new battle. If the opponent does not provide an answer to the challenge within the predetermined time period, then the slot may be available for a new battle and the challenger receives a point. In one embodiment, an opponent who refuses a challenge or does not answer a challenge may be restricted from battling the artist who challenged until the opponent completes a predetermined number of battles. In certain embodiments, artists who are challenged by other artists but who refuse the challenge or do not respond to a challenge within a predetermined time may lose points or have another penalty applied.

In various embodiments, the challenger artist and/or the opponent artist can customize the terms or other features of their battle together. In one example, the challenger artist or the opponent artist can impose different conditions on the battle, such as the time limit, a vote quantity limit, or a number of points to be awarded, and/or other conditions under which the battle is to be conducted or decided. In another example, the artists may together agree to a time limit, a vote quantity limit, a number of points to be awarded, and/or other conditions under which the battle is to be conducted or decided. In another example, the opponent artist may be permitted to communicate a counter-proposal to the challenger artist with a preference for limits, features, or other conditions of a battle. Proposals and counterproposals for a battle can be communicated back and forth between the artists until mutually agreeable parameters for the battle have been decided between the artists. It can be appreciated that other modules 106 of the system 102, such as the scoring module 106G, may be programmed to process results, scores, or other battle-related data in connection with customization of the limits, features, or conditions under which a battle is conducted between artists.

In various embodiments, one or more voters may be able to customize the parameters of one or more battles conducted between artists. For example, the voters may determine time limits, vote quantity limits, a number of points to be awarded, and/or other conditions under which the battle is to be conducted or decided between the artists. It can be appreciated that other modules 106 of the system 102, such as the scoring module 106G, may be programmed to process results, scores, or other battle-related data in connection with customization of the limits, features, or conditions of a battle by a voter. In certain embodiments, voters may be permitted to customize the parameters of a battle or to propose suggestions for battles; in other embodiments, voters may be permitted to more directly create and manage battles between artists (e.g., without the need to submit a request to propose a battle, as described with respect to other embodiments discussed herein).

Once the challenger and the opponent have both agreed to fight, then the battle can start. A battle can be programmed to receive votes for a predetermined time period, such as a number of hours or days, for example. The winner of a battle can be declared to be the artist receiving the most votes once the battle has been concluded. In certain embodiments, points may be awarded for various battles through the scoring module 106G. For example, the challenger may receive one point for initiating the battle; the winner of the battle may receive three points; and, the loser of the battle may lose three points (unless the loser currently has zero points, in which case the loser may remain at zero points). In another example, if the battle is a draw, then both artists may receive two points.

Once two artists have agreed to start a battle, there can be ways other than manual selection to determine the tracks or elements that will compete. In one example, selection of the track or element for the battle can be chosen randomly by the system 102. In another example, a mix of random and/or manual selection of tracks/elements in any order and any quantity can be used. A random process may be purely random or may adopt a series of criteria in order to automatically select the track. The system 102 can track how frequently or how infrequently a track has been randomly chosen and increase or decrease the probability percentage for selection of the track accordingly. In another example, the process can adopt a series of criteria such as filtering the choice with artists in similar position in the rankings, filtering the choice with a specific quantity of points and/or specific ranking positions regardless of the similarity.

In certain embodiments, battles may be automatically decided by the system 102. In this option, scoring, points, and rankings processes still exist, but the battle module 106E operates automatically and is managed by the system 102. For example, the system 102 can execute battles with a predetermined schedule comprising battles matched equally for everyone, or a dynamic schedule wherein battles do not start and finish in the same amount of time or the same vote quantity for every user in the class. This process can be purely random or can adopt a series of criteria such as filtering the choice with artists in similar position in the rankings, filtering the choice with specific quantity of points, and/or applying specific ranking positions regardless of the similarity.

In certain embodiments, a game over rule may be applied wherein if an artist loses a predetermined number of battles consecutively, then the account of that artist may be permanently canceled. If a game over rule is not applied, then the artist may remain at zero points until a battle is won. In other embodiments, the game over rule can be applied to consecutive lost battles and/or to a predetermined class level. In another example, the game over rule can be implemented with an elimination zone in the entry class of each category championship (e.g., the artist in the last position is eliminated). In another example, an artist can be immediately eliminated upon arriving in the elimination zone or after a specific amount of time and/or battles (independent of the battle results). In certain embodiments, the eliminated artist may be allowed to re-open an artist account, may be barred from opening an account, or may be barred for a specific amount of time. In other embodiments, the game over rule can be randomly applied to any artists or group of artists, regardless of class or ranking, for example. Users may be permitted to request a vote on the journal to apply a game over rule to a user or group of users. In another example, a game over rule can be applied wherein if an artist remains at zero points after a predetermined number of battles and/or a predetermined length of time, then the artist's account can be canceled or the artist may be suspended from further participation in the system 102. One or more game over rules may be applied as part of the operation of the scoring module 106G, for example, or another module of the system 102.

FIGS. 16A-16G illustrate examples of various aspects of a screen 1602 that can be displayed by a bulletin module 106H when a "Bulletin" link is selected from various parts of the social network system 102. As shown, the bulletin may provide a news section 1604 including information about competitions, works of art, artists, voters, activities occurring within the system 102, and/or information that impacts the system 102. For example, each time a battle starts, the bulletin can automatically generate news regarding the battle and a link to view the battle or to vote on the battle. In one embodiment, when a battle ends, the bulletin can be used to announce the winner. In another embodiment, each time an artist uploads a work of art, the bulletin can provide news regarding the upload and/or a link to access audio or video content related to the uploaded work of art. In another example, when an artist is promoted or demoted between class levels, the bulletin can communicate news regarding the promotion or demotion. In various embodiments, news may be displayed in chronological order and/or by one or more importance parameters. For example, a class of artist may be an importance parameter applied to news about battles that have been started. In another example, the number of voters voting in a battle may be an importance parameter for a completed battle. In another example, a number of artist supporters may be an importance parameter for news regarding a new track or upload by the artist. In another example, class level of an artist may be the important parameter for news regarding class promotion or demotion.

In various embodiments, one or more filters 1606 may be applied to information presented by the bulletin. The filters 1606 may be embodied as buttons which allow users to filter the news by parameters such as genre; by "my class" to display news only about a certain class of artist; or by "supporting" to display news only about the artists the voter supports. Other sub-filters that can be applied include displaying the news of a selected kind, such as when the battle started, battle results, new tracks loaded, and class promotion. In addition, a search function 1608 can be provided for searching news within the bulletin in various ways.

Figure 17:
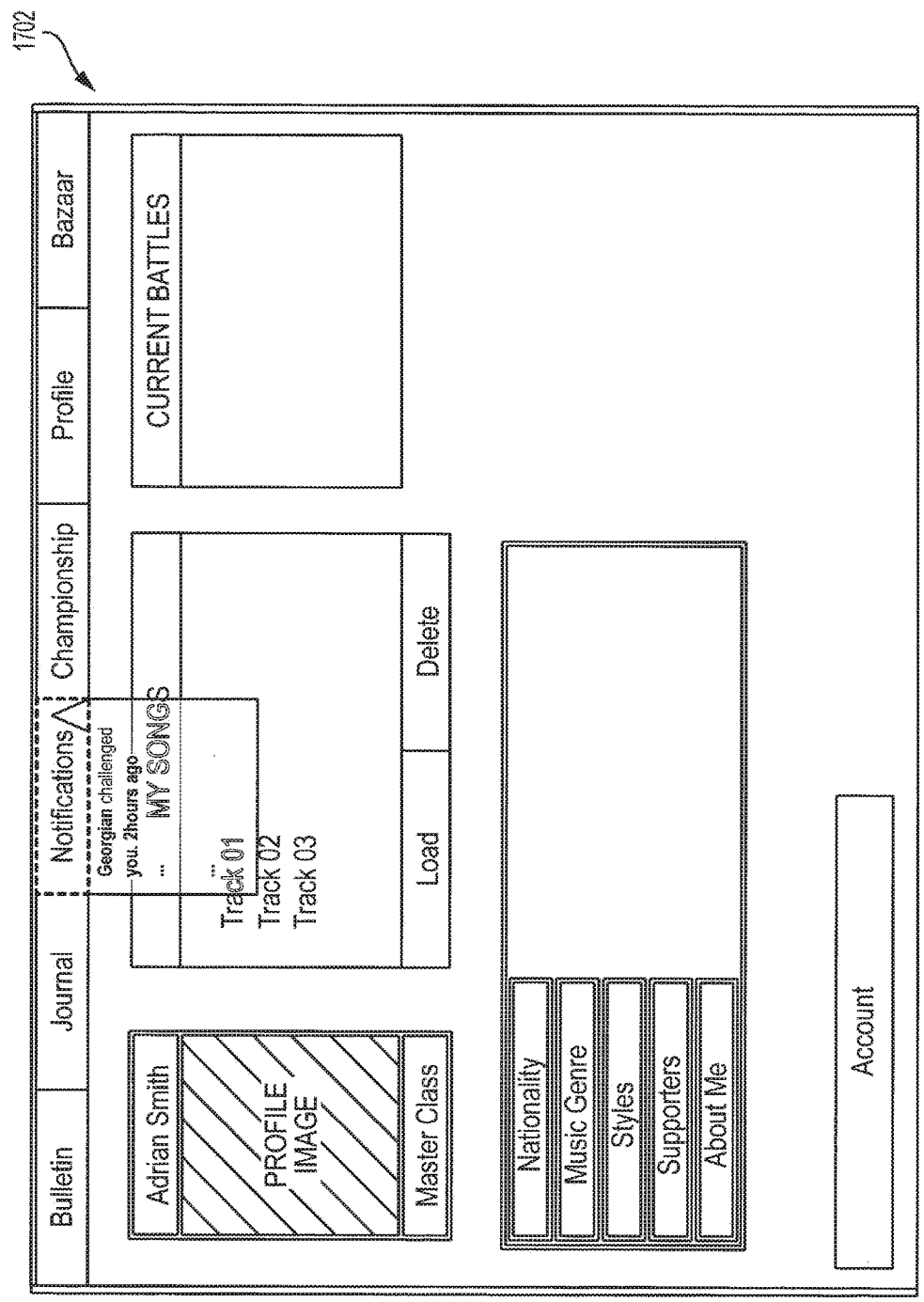
FIG. 17 includes an example of a screen display that can be displayed to users in a notifications section structured in accordance with various embodiments of the invention.

FIG. 17 illustrates an example of a screen 1702 that can be displayed by a notifications module 106I when a "Notifications" link is selected from various parts of the social network system 102. Examples of notifications which can be communicated in connection with artists include challenge requests; opponent challenge agreement/acceptance; battle results; results of the battles voted; class promotions and demotions; involvement in a poll, survey or article in the "Journal"; result of a poll or survey voted in the "Journal"; suggestions and advertising information; among others. Examples of notifications which can be communicated in connection with voters include information and activity of supported artists; voting results of battles; accepted proposal of article, poll or survey the "Journal"; result of a poll and survey voted in the "Journal"; suggestions and advertising information; among others.

Figure 18A:
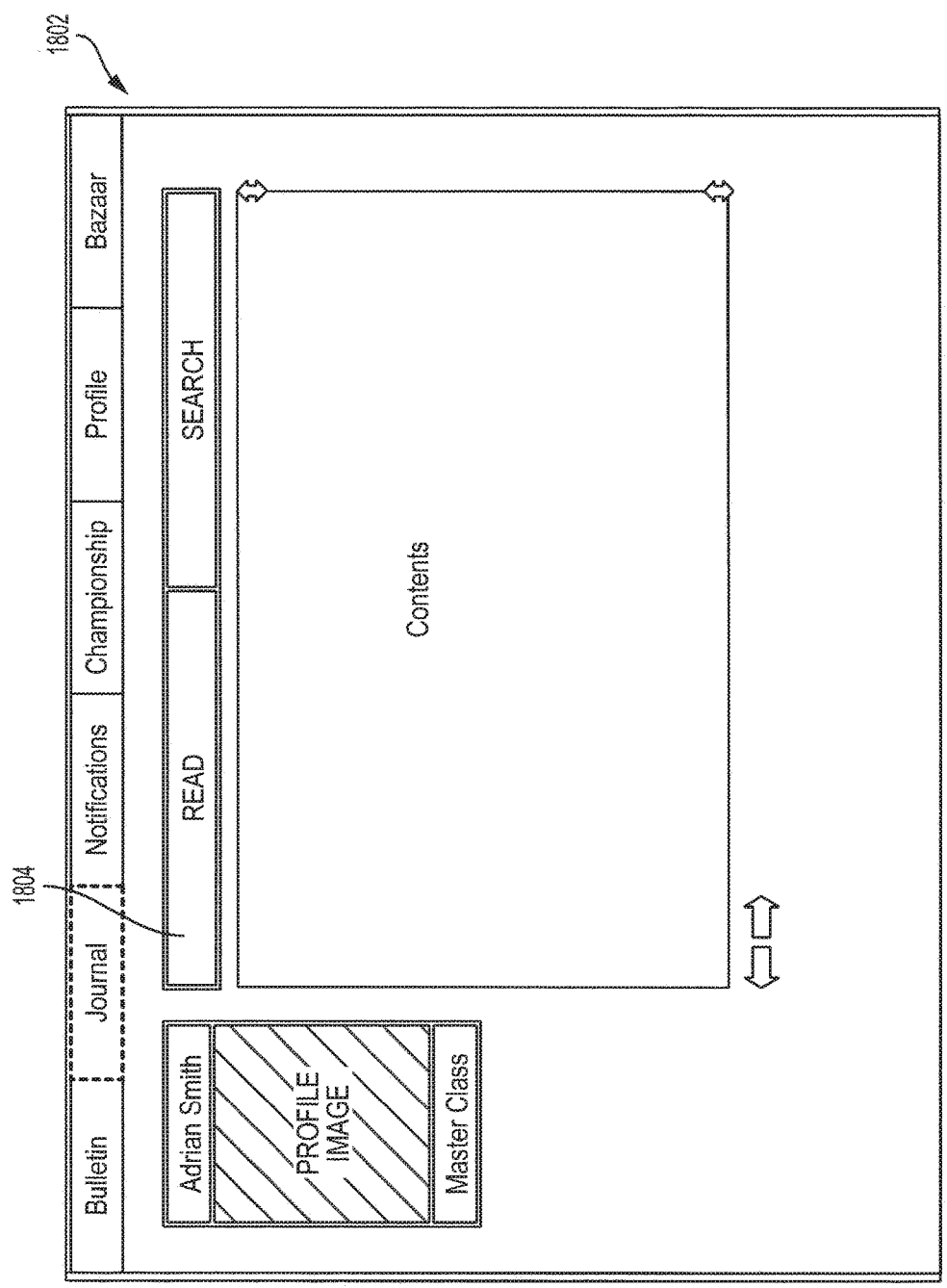
FIGS. 18A through 18C include examples of screen displays that can be displayed to users in a journal section of a social network system structured in accordance with various embodiments of the invention.
Figure 18B:
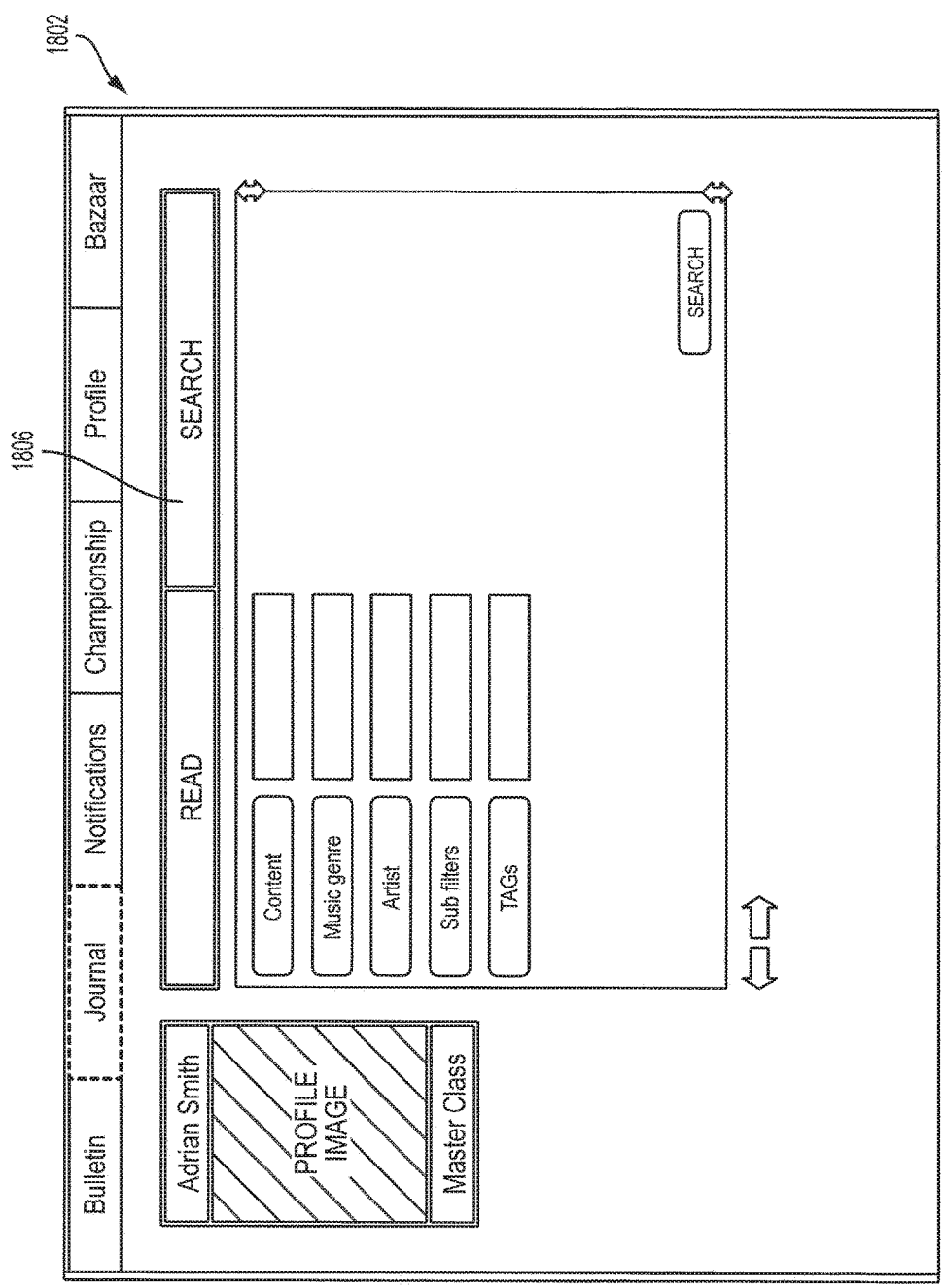
Figure 18C:
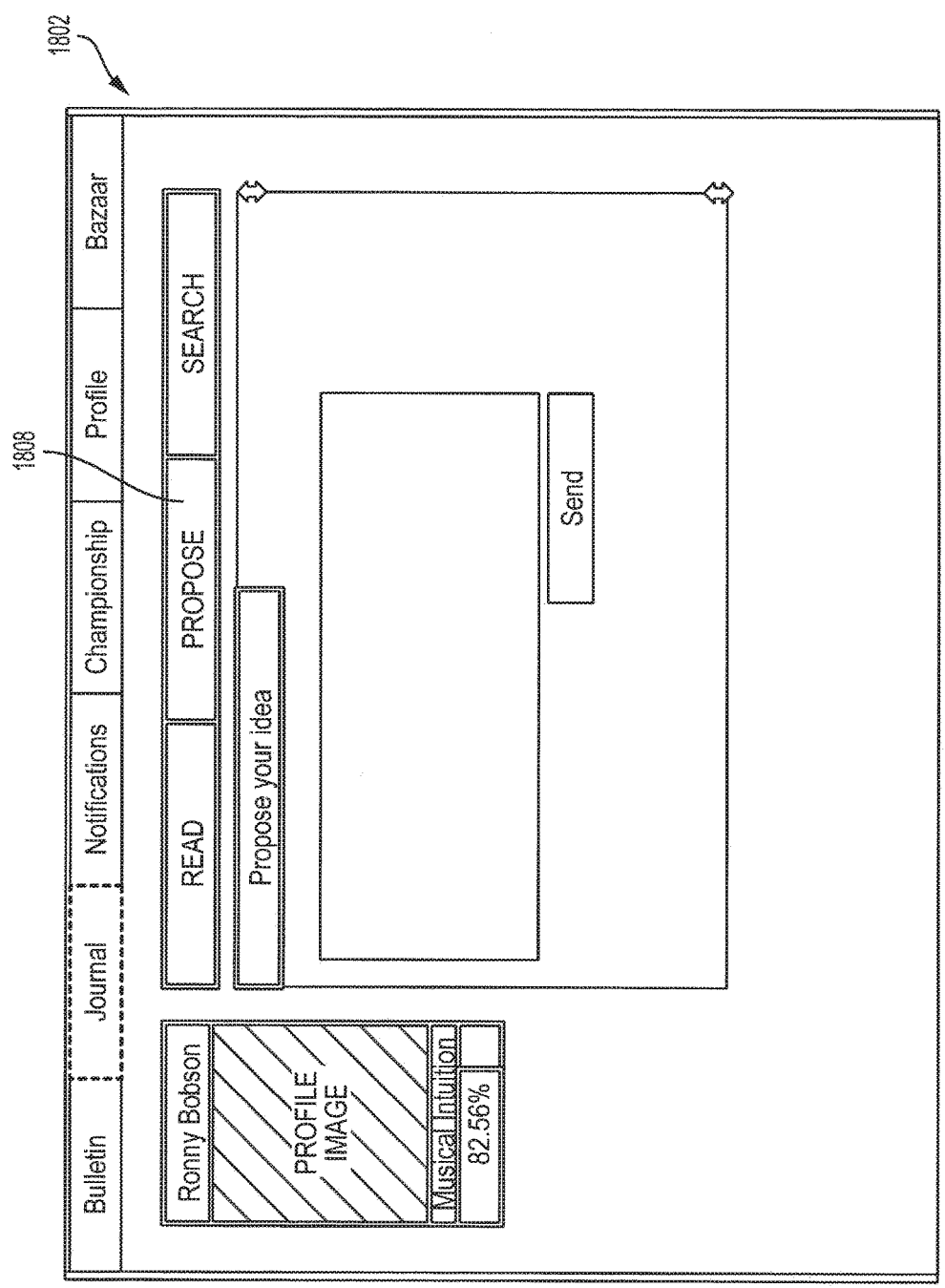

FIGS. 18A-18C illustrate examples of various aspects of a screen 1802 that can be displayed by a journal module 106J when a "Journal" link is selected from various parts of the social network system 102. The journal may be embodied as a web-based newspaper wherein dedicated editorial staff of experts, journalists and people with a passion for works of art can publish articles, polls and surveys. Topics for the journal may be derived from activities occurring on the social network system 102, as well as the world of art and all its aspects. Voters can propose contents to the editorial staff and if the content is acceptable (e.g., an article, poll or survey), it can be published on the journal. Advertising content may also be published in the journal. As shown, accessing a "Read" button 1804 directs the user to journal news, and a "Search" button 1806 directs the user to a search panel where contents of the journal can be searched. In various embodiments, accessing a "Propose" button 1808 directs the user to a form where the user can write a message to the editorial staff, for example, proposing their contents and ideas. In various embodiments, the experts, journalists and topics covered in the journal can be modified according to the relevant art form. For example, the journal may discuss the sculpture world and anything involved with a sculpture competition. In certain embodiments, users may lobby management of the system 102 through the journal to organize a battle between two artists or can ask for other votes, with or without application of particular rules. In one example, a voter or other user can propose a battle between two different artists, with or without specifying what works of art the artists should select for the battle. In another example, a given user may request that a vote be taken on the journal to decide whether different proposed artists should engage in a battle. In certain embodiments, user requests can be communicated directly to other components or modules 106 of the system 102, such as through use of a voter profile, for example. In one example, a user can submit a request for a modified game over rule directly to the system 102, through a component or module 106 of the system 102 other than the journal, for example.

In various embodiments, decisions to honor requests by users to adjust rules (e.g., the game over rule), to organize battles between artists, and/or to perform other activities within the system 102 can be made subject to one or more criteria. For example, the decision to execute a request can be done randomly. In another example, with regard to requests by voters, artistic intuition scores or rankings can be used to increase or decrease the probability that a user will have a request executed. With regard to requests by artists, for example, position in the rankings or class level can be used to increase or decrease the probability that an artist will have a request executed. The probability of executing a request can be based at least in part on using one or more filters such as artistic intuition score, ranking position, class, and/or others. For example, a voter that is more successful at voting rock battles with higher artistic intuition in the rock category may have a higher probability to have a request for organizing a rock battle accepted than another category in which he has a lower artistic intuition ranking. In another embodiment, one or more users can be chosen at random by the system 102 to submit a request to be executed. In another example, selection of a user by the system 102 may be based on information collected in response to user profiles, user transactions, user behavior, or other user information collected within the system 102. A certain user action within the system 102, such as voting in 1000 battles, for example, may trigger selection of the user to submit a request for execution. In certain embodiments, approval of requests can be based on time or quantity factors, such as every month four user requests for game over rules or battle organization will be executed, for example, or perhaps the first four users to make a request at a predetermined time will have their requests executed. It can be appreciated that the above alternative embodiments involving user requests may be combined in any reasonable way. Also, user requests may be reviewed and approved solely by the system 102, solely by personnel of the system 102, or by some combination of human-computer interaction.

Figure 19:
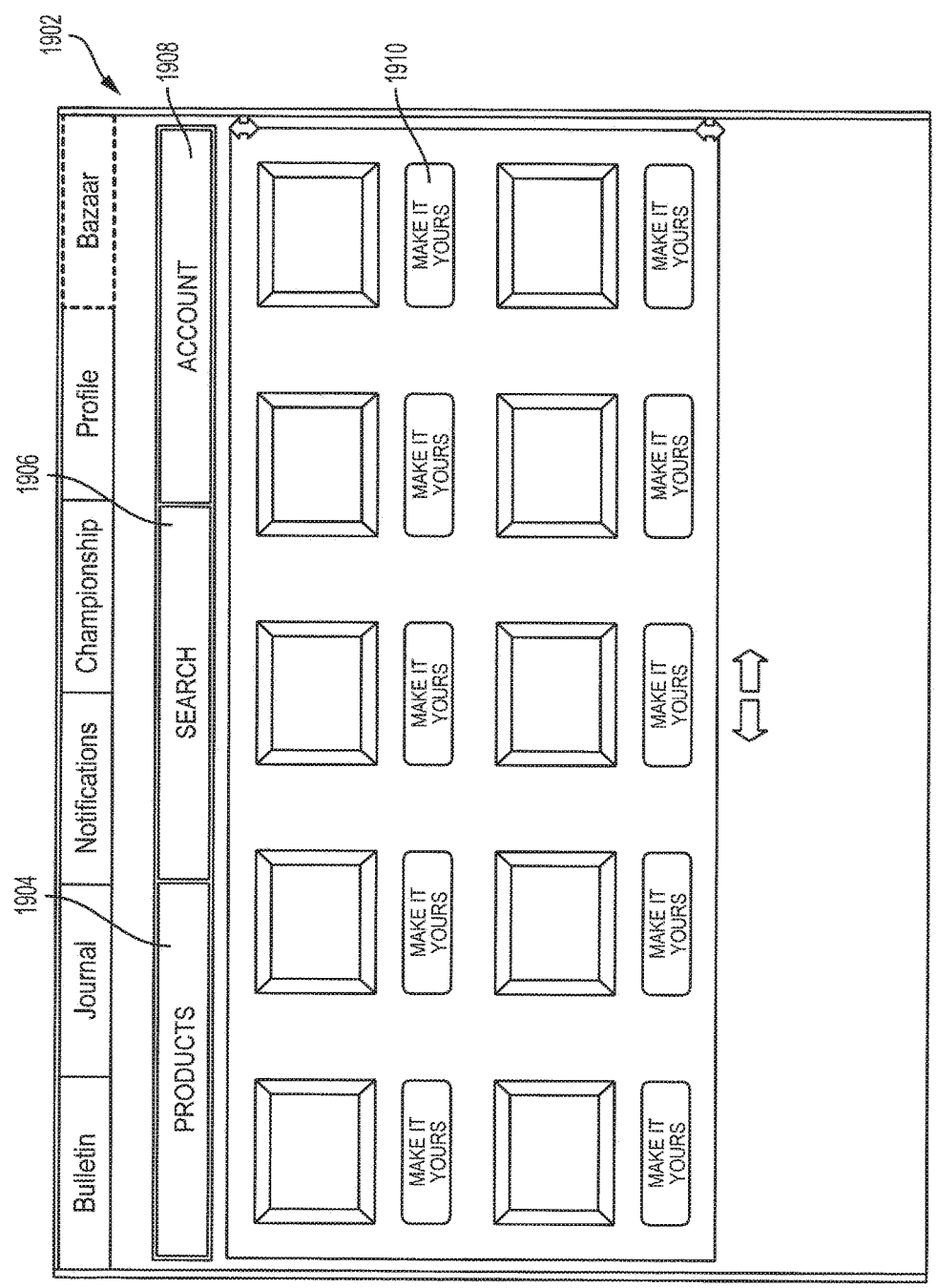
FIG. 19 includes an example of a screen display that can be displayed to users in a bazaar section of a social network system structured in accordance with various embodiments of the invention; and, FIGS. 20 through 26 include process flow diagrams illustrating various examples of communicating advertising content in accordance with various embodiments of the invention.

FIG. 19 illustrates an example of a screen 1902 that can be displayed by a bazaar module 106K when a "Bazaar" link is selected from various parts of the social network system 102. The bazaar may represent an online store where registered users can buy art-related products. A survey can be connected to each product in the bazaar for completion by registered users. A "Products" button 1904 can be accessed for directing users to a list of products on a page in the bazaar. A "Search" button 1906 directs users to a product search panel, and an "Account" button 1908 directs users to their user account pages. Various "Make It Yours" buttons 1910 can direct users to a purchase module 106L of the social network system 102 for finalizing purchase and payment for a product, for example.

In various embodiments, an analytical module 106M can be provided which is operatively associated with one or more of the other components or portions of the social network system 102. The analytical module 106M may be programmed to run continuously and can be accessed in real time with the ability to dynamically alter its parameters at various times. In operation, the analytical module 106M may be programmed to collect, record, analyze, and/or manipulate data to be visualized in any form such as, for example, text and graphs. In certain embodiments, the data may be exported and/or used with an automation module 106N (see below), and/or other modules of the system 102.

Data which the analytical module 106M may be programmed to process includes, for example, a number of users registered (e.g., currently active registrations and/or historical registrations), with the option to filter the data according to user typology or registration frequency on typology and time basis, and/or with the option to predict future trends based on previous data. Other data include, for example, number of user accounts closed (e.g., currently deleted registrations and/or historically deleted registrations), with the option to filter the data according to user typology or deletion registration frequency on typology and time basis, and/or with the option to predict future trends based on previous data. Further examples of data that can be processed by the analytical module include, without limitation: enrollment per category for artists; enrollment per category for voters; frequency of loading new tracks; frequency of deleting old tracks; quantity of tracks loaded on absolute scale, per user, per category, per class; frequency of voting current battles per hour, per part of the day, per week day, per month, or any other time-basis (e.g., analyzing how many battles are voted in a specific time); frequency of use of the available ways to vote the battles (e.g., how much voters use and/or prefer a certain way to vote); frequency of battles started (e.g., how many battles are connected to a specific occurrence, track, artist, etc.); quantity of voters that have already voted a battle in relation to the total number of voters and in relation to the time elapsed until the battle closes (e.g., it is useful to know about a current battle that lasts for seven days that 96% of the voters of that class or category have already voted after two days, perhaps to adjust a time limit for the battle).

Other examples of data that can be processed by the analytical module 106M include, without limitation: quantity of running battles per voter and perhaps for a specific period of time (e.g., if a voter can potentially vote 5000 different battles per day a limit of artists available to compete in battles simultaneously can be modified to reduce the ratio); quantity of running battles per day (or any time period) per voter; a ratio between the number of voters and the running battles; ratio (and percentage) between the quantity of running battles and the quantity of battles that have received a vote and/or a predetermined quantity of votes (e.g., if there are 4000 running battles and only 50% have received one vote, 38% have received fifty votes or less, and only 5% have received 3000 votes or more, then the length of the battle can be adjusted, and the number of battles an artist can fight simultaneously can be limited or adjusted; e.g., if there are 4000 running battles and only 50% have received one vote corresponding to 0.5% of the voter population, 38% have received fifty votes or less corresponding to 2.5% of voter population, and only 5% have received 3000 votes or more, then the length of the battle and/or the number of battles an artist can fight simultaneously can be adjusted); quantity of time which users spend on bulletin, journal, voting, bazaar and/or visiting profiles; quantity of time which users spend connected to the system 102; and/or, how many articles users propose to the journal. In various embodiments, data collected or analyzed by the analytical module 106M can be processed historically, at a current time, for typology, on any time basis, used to predict future trends, used with any statistical or mathematical method.

In various embodiments, the analytical module 106M can be programmed to collect, analyze, or process user information. A profile archive can be created for one or more registered users where all collected user information can be stored and associated with each user. Information can be collected that users insert into the system 102 on both a required and voluntary basis such as, for example and without limitation, e-mails, country, location, style, preferences, and pictures. Also, information obtainable by tracking user behavior in the system 102 can be collected, such as the quantity of time a user spends on the journal or logged into the system 102, what category a voter likes to vote more, what advertising banners the user selects, and other behaviors. Any human-computer interaction can be tracked and tracking code can be implemented in various aspects of the invention. Such tracking code can be customized based on what information to collect and report to the system 102. In certain embodiments, the analytical module 106M can be used to identify and store general user preferences, particular group preferences, and/or personal user preferences. A user profile, a group profile and/or a general profile can be created including all the registered users or a subset of registered users, for example. Groups of people with similar interests and behaviors can be profiled using the information collected and targeted advertising can be selected for display accordingly. Information manipulation can include common database manipulation such as group, order, or select (SQL like). Information representation can be in the form of text or graphical visualization like tables and charts, for example.

In various embodiments, the social network system 102 may be operatively associated with an automation module 106N programmed to work with the analytical module 106M, for example, and/or other modules 106 of the system 102. The automation module 106N can be linked in real-time with the other modules 106 and can be programmed with instructions to perform under certain circumstances or triggering events. For example, a portion of the instructions may verify that certain predefined conditions have happened or not happened through communicating with the analytical module 106M. Such conditions may arise from analyzing data which match a specific target numbers or a range, for example, or data that fall above or below such target numbers or ranges. Other instructions may verify a condition and then execute commands to modifying a quota of promotion, for example, or number of battles playable contemporaneously. The automation module 106N can be programmed to continuously check for such conditions by cooperatively communicating with the analytical module 106M and execute commands accordingly.

In various embodiments the social network system 102 may be operatively associated with an advertising and sales communication module 106O programmed to work with one or more of the other modules 106 of the system 102. With reference to FIGS. 20 through 26, the advertising and sales communication module can be programmed to monitor or analyze activity and transactions occurring within the system 102 and deliver or communicate advertising content, for example, in accordance with that monitoring or analysis.

Figure 20:
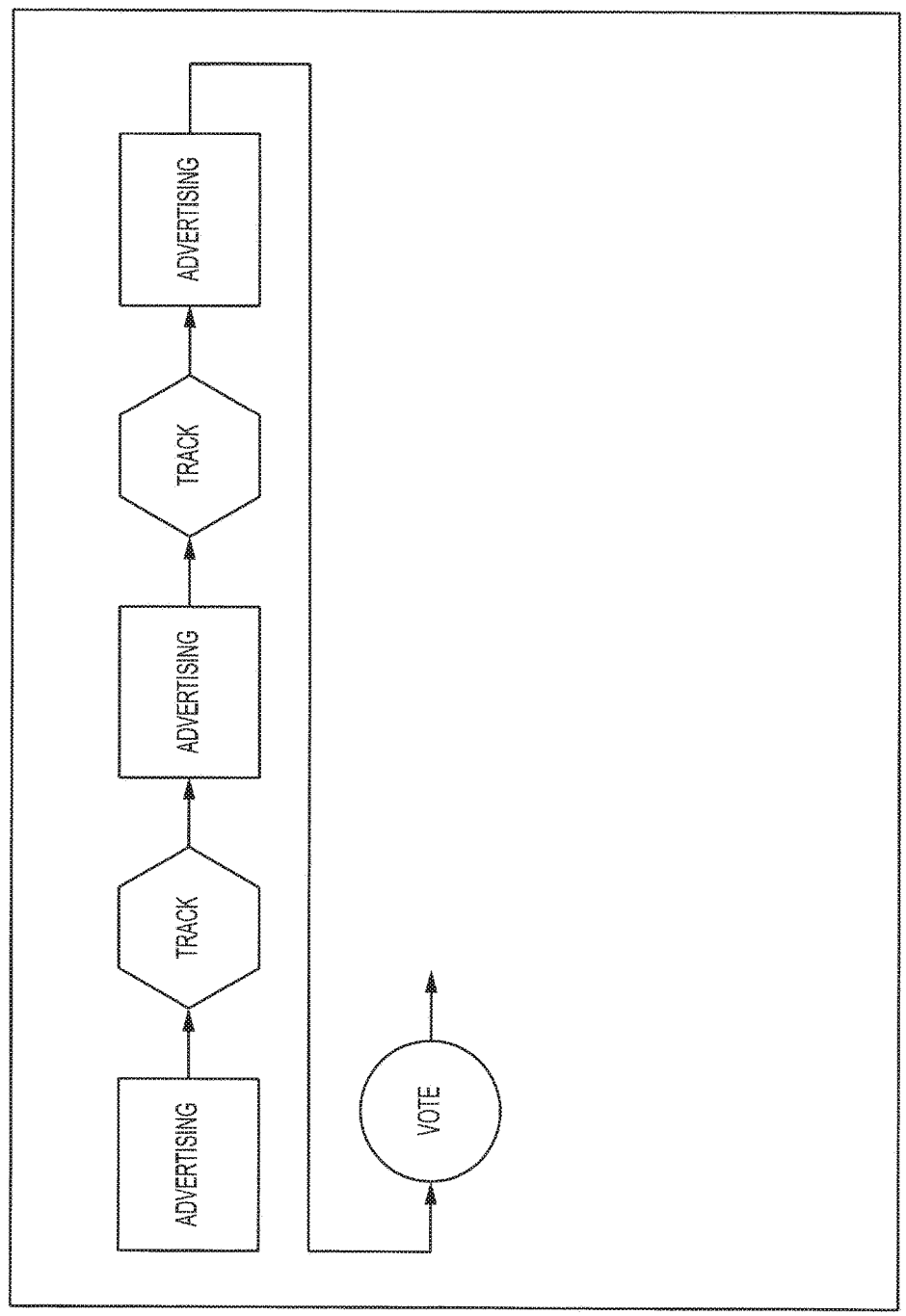
Figure 21:
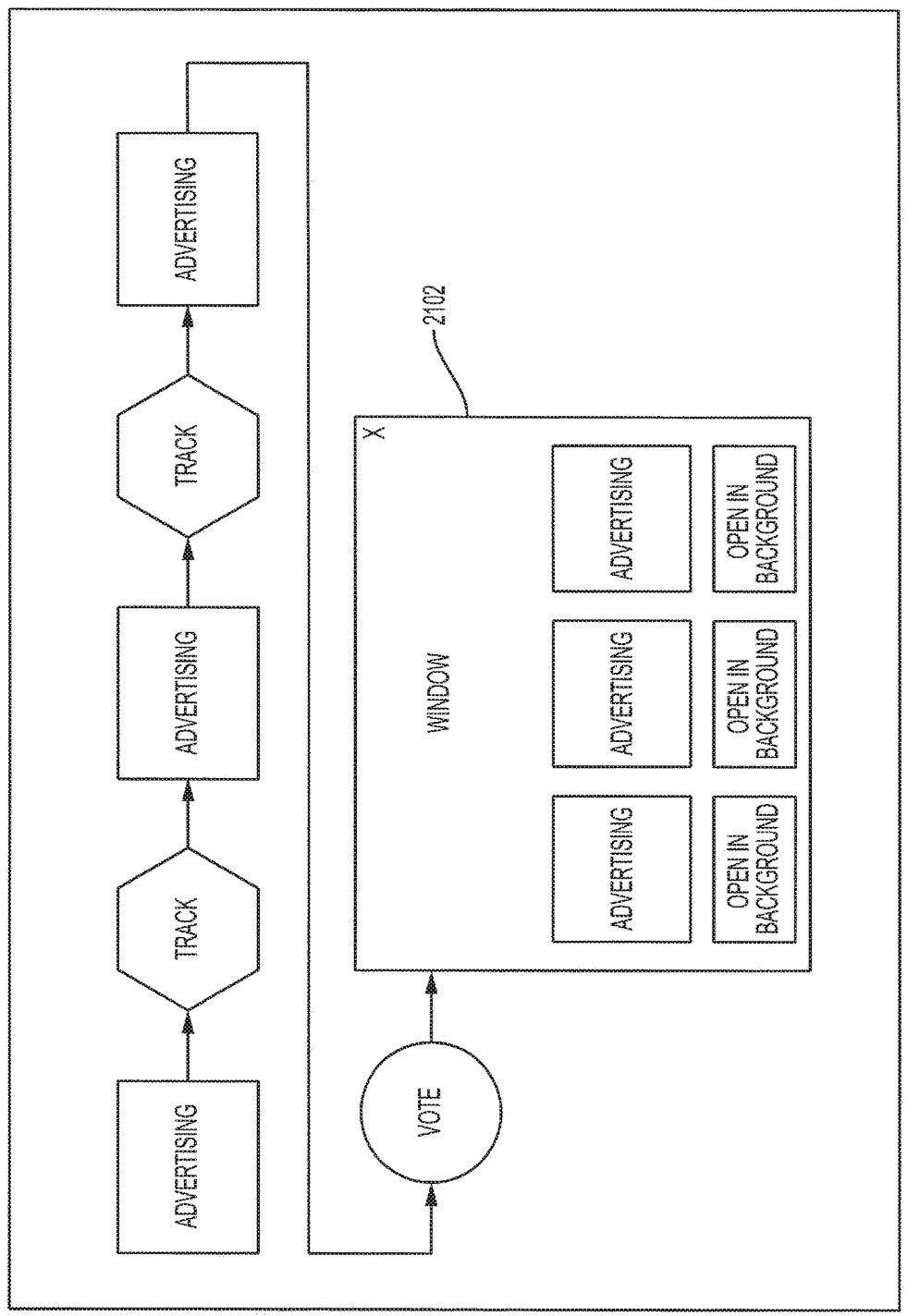
Figure 22:
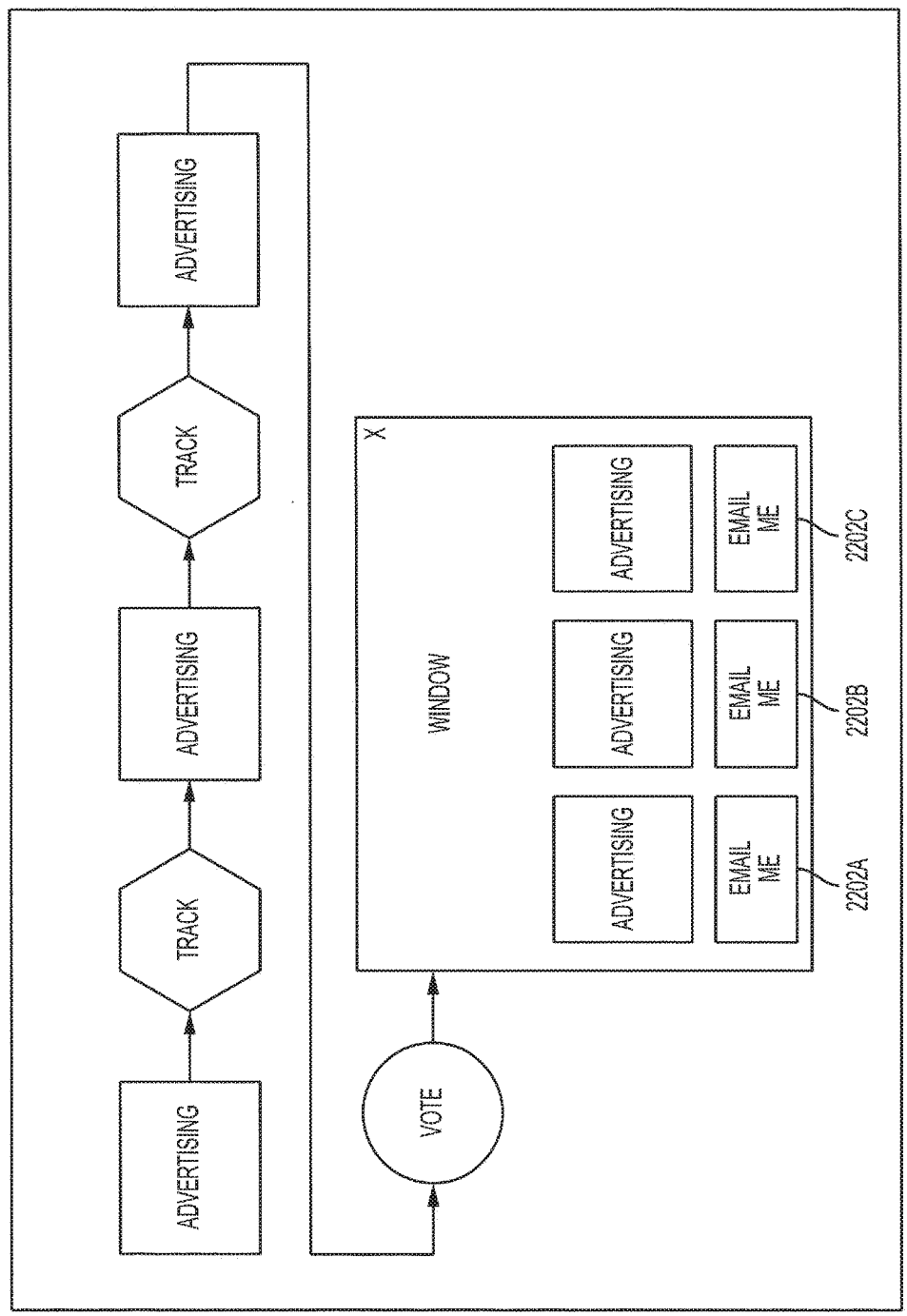
Figure 23:
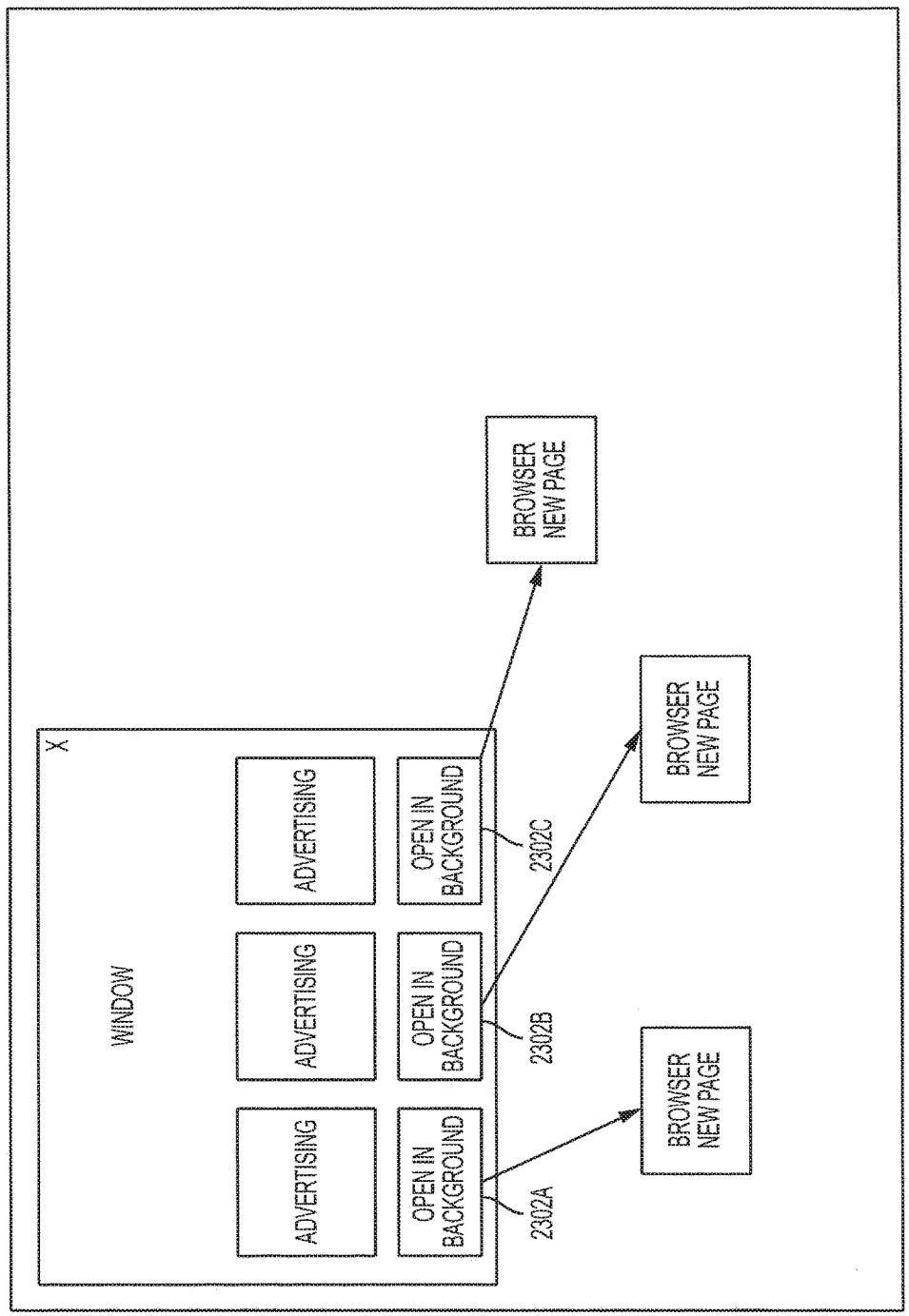
Figure 24:
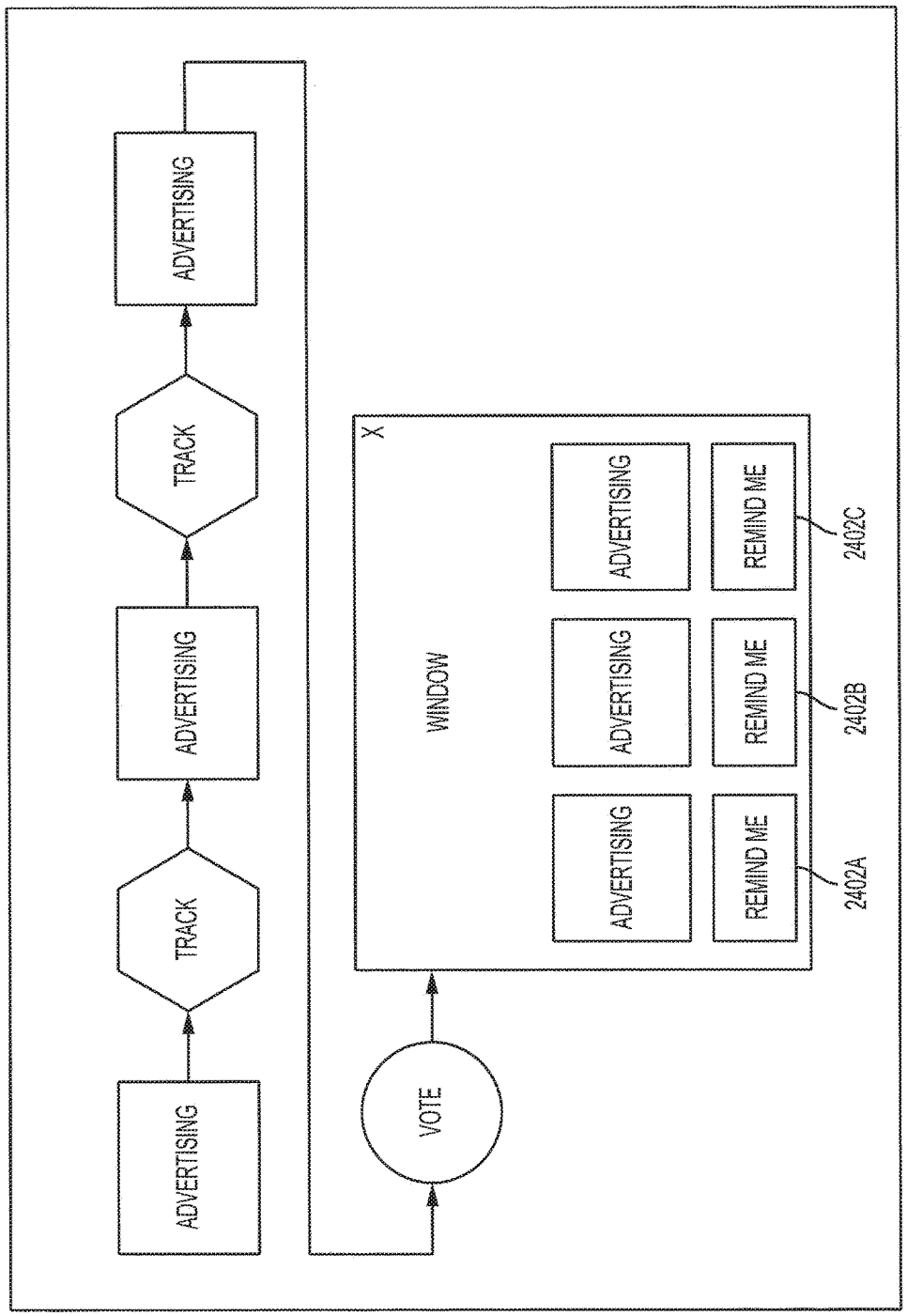
Figure 25:
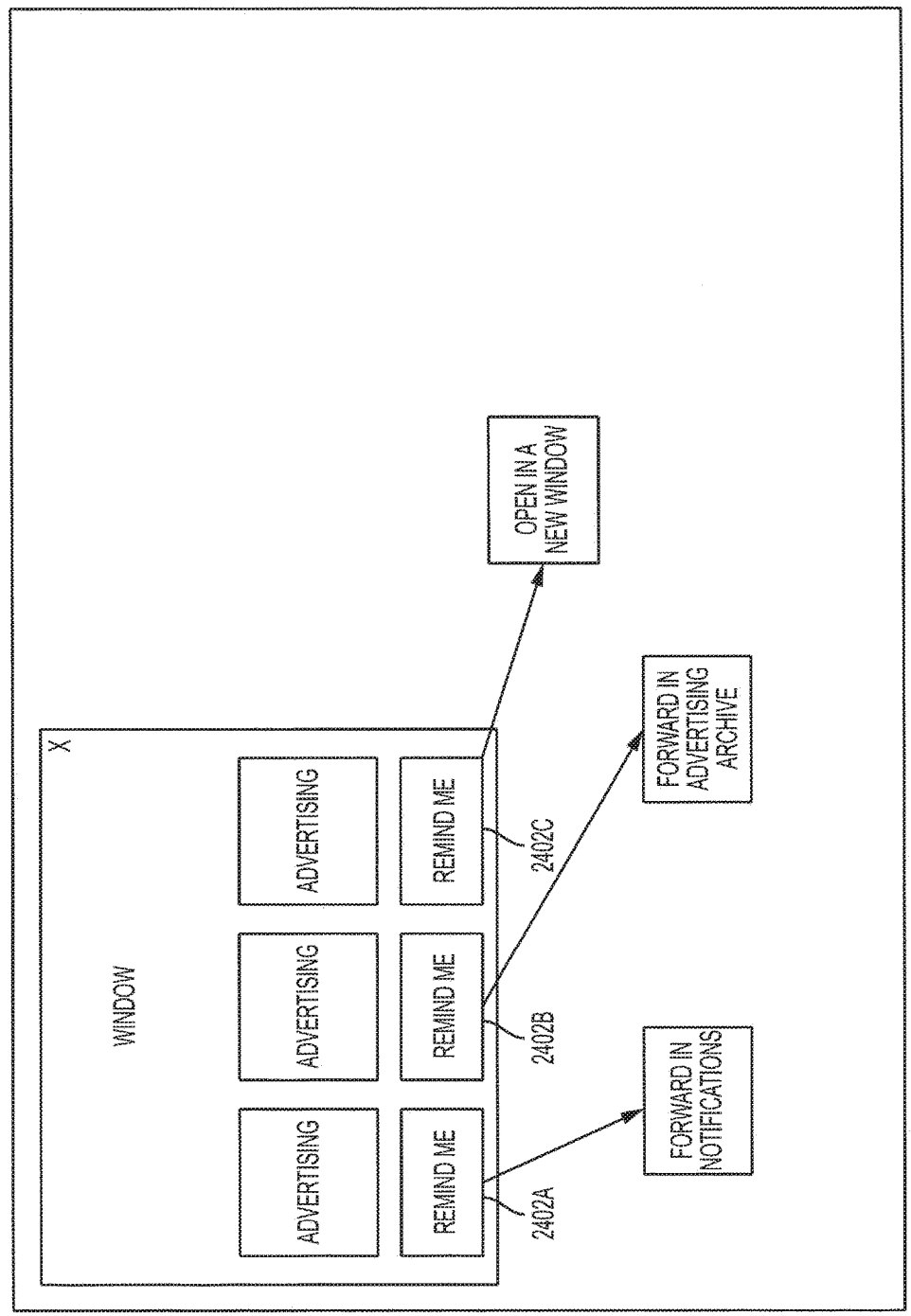
Figure 26:
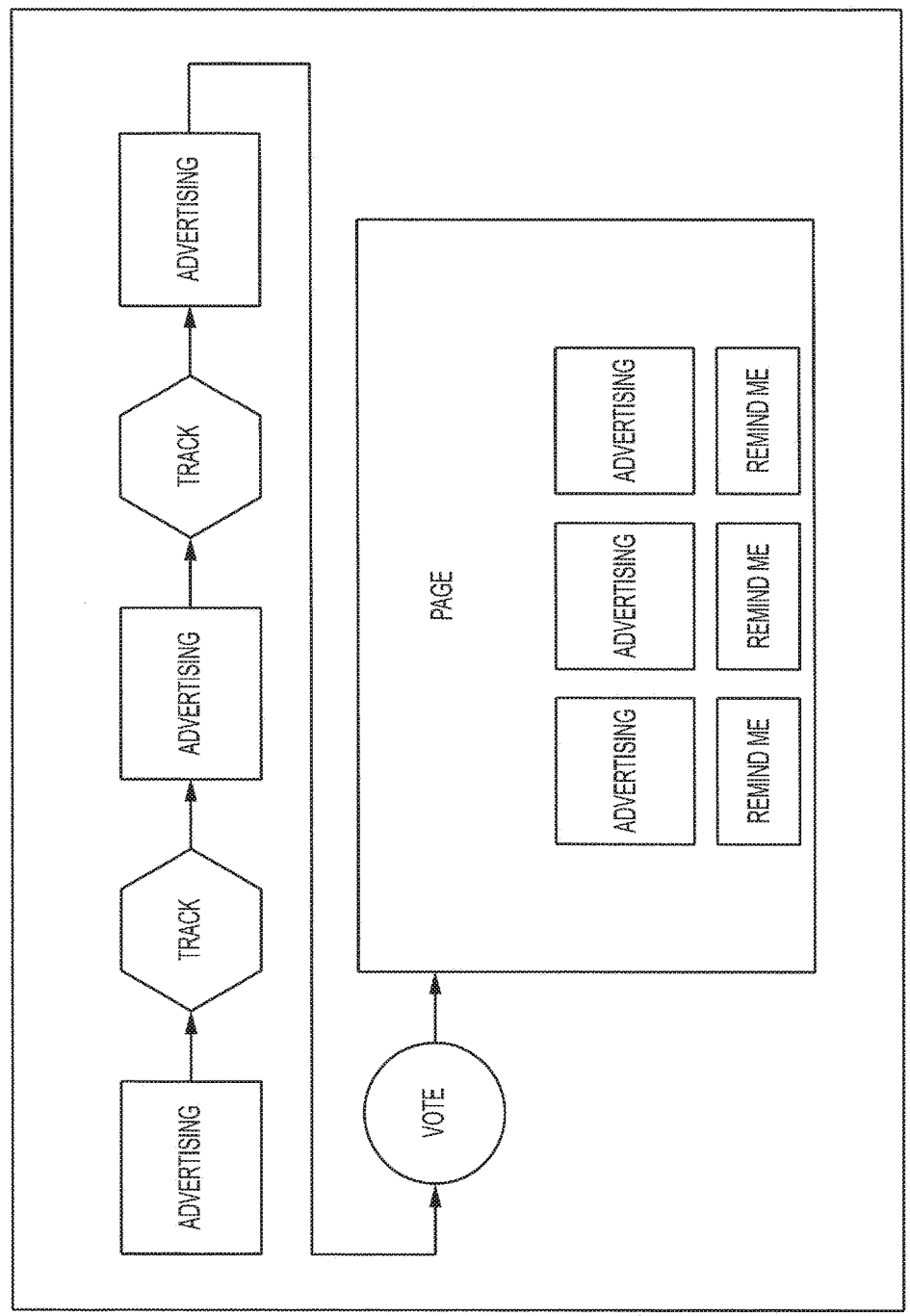

For example, the advertising module 106O can be programmed to place advertising spaces before, between and after the execution of tracks to be compared, and prior to a voter voting (see FIG. 20). Advertising spaces can be placed in the same page and in the same execution platform of the tracks (e.g., in the case of videos, the advertising content can be placed in the same space or platform where tracks are visualized, and/or video ads can be executed before, during, or after execution of the tracks). Advertising spaces also can be placed in the same page but in other execution platforms or spaces. The advertising spaces can be fixed and/or dynamic in their form, size, appearance and position. Advertising spaces can be displayed for unlimited or limited time duration, periodically, at predefined times, or at random times. Advertising spaces can be placed in an independent or different page or execution platform from where the tracks are executed.

In various embodiments, advertising for the track or element comparison system with voting features can be inserted as content including, but not limited to, videos, images, and interactive banners. The content can be configured with various physical dimensions and time duration which correspond to the performance of the content in the advertising spaces (e.g., the duration of an advertising video can be set to five seconds to match the duration of a track preview). In certain embodiments, the advertising content can be configured with various physical dimensions, features and time duration independently of the features of tracks played during a competition (e.g., the duration of an advertising video can be three to four seconds, which does not necessarily correspond to a track played during a competition which may be of a longer time duration). It can be appreciated that providing advertising content of limited, predetermined time duration can represent a more user-friendly approach to advertising products and services. Such an advertising approach provides a less intrusive and more enjoyable experience for consumers, maintaining consumer attention while also increasing available advertising space. The inventors appreciate that offering more frequent, but shorter duration video advertising "pills" to consumers is generally preferable to less frequent and longer duration content. The order and the direction of the advertising and the tracks can be performed in any way. In one example, the first advertising space can be placed before the first track, the second between the first and second track, and the last at the end of the second track. The user can be automatically directed or can choose manually to go ahead or go back after a track and/or advertising content has been displayed. In certain embodiments, spaces can be inserted or appear in any way and form on the side, for example, or anywhere in the page or on the platform screen, and/or when the user is previewing the tracks. In another example, after the user casts a vote, a window 2102 can be displayed in which advertising spaces can be included with the possibility to add description or additional elements of the advertising (see FIG. 21).

In other examples, advertising content for the track or element comparison system with voting features may include interaction between the users and the displayed advertising. For example, an "email me" button 2202A-2202C can be included to forward the advertising content to the user's email (see FIG. 22); an "open" button 2302A-2302C can open a new page in the Internet browser directing the user to a web page associated with the advertising content (see FIG. 23); and/or, a "remind me" button 2402A-2402C can forward a reminder through the notifications module 106I to the user's account, or to an advertising archive where users can save the selected advertising or open a reminder in a new page (see FIGS. 24 and 25). Reminders can include links to the advertising Internet page, text, and/or PDF information. The tasks of communicating reminders, e-mail forwarding, or new page openings may be automatically performed by the system 102 with or without user interaction. In another example, instead of a window opening, the user can be directed to a page that can include various advertising mechanisms (see FIG. 26). In another example, after the user has cast a vote, there may be no other advertising spaces or mechanisms displayed. In another example, an option bar can be opened or closed to provide various options regarding the display of advertising content.

The advertising module 106O may be programmed to display advertising content in other user displays. For example, advertising spaces may be included in user profiles; in the bulletin, which can be placed between the news or in any other part of the pages; in the journal, which can be placed between the articles and/or published contents or in any other part of the pages; in notifications, wherein advertising can be sent as a notification window or in any other notification format; championship displays, wherein advertising can be placed between the rankings and/or the current battles, on the page and/or on the battle panels; and/or in the bazaar or other online stores. When the user is logged into the system 102, advertising spaces or pages can appear before navigating the user to a next selected page or section, or when no action is taken by the user. The user may or may not be permitted to stop the display of advertising content. In another example, advertising content can be displayed in the form of a temporary banner or window. Advertising can also substitute or overlap elements of the page not otherwise associated with advertising elements, either temporarily or not (e.g., the user profile picture can be substituted with advertising images or the championship button may display a banner instead of the button for a period of time. When the user selects an advertising element that has replaced some other function (e.g., a button), the replaced function can retain its functionality or an advertising functionality can be implemented (e.g., if the graphical image of the button "Championship" has been substituted with an advertising graphical image, then the button itself can still direct a user to the "Championship" page, or the button can implement a link or other advertising interaction). In certain embodiments, any space displayed by the system 102 may include advertising content.

Based on the user profiling operation of the analytical module 106M, the advertising module 106O can be directed to display tailored advertising to users. For example, advertisers may provide descriptive information about their companies and/or advertised products, so that the advertising module 106O can match user preferences and behaviors with appropriate advertising content. Such tailored advertising gives priority and preference to advertising content that is likely to be more important to the user. In certain embodiments, the tailored advertising can be adjusted on personal, group, and/or a general basis. In one example, a user logs into the system 102 from Paris but his profile states that he is from London. The user often votes for house music battles, and therefore there is a likelihood that he enjoys venues such as clubs playing house music. In this example, the advertising module 106O can give precedence to club advertising playing house music over other types of advertising content, and may further give precedence to clubs located in Paris since the user has logged into the system 102 from Paris and is currently not in London. In certain embodiments, companies can be permitted to sell targeted advertising through the system 102. Companies can select a specific audience which they prefer to target by their own criteria and/or may have access to groups already profiled in the system 102. The tailored advertising can be based on the user point of view while the targeted advertising can be based on the advertiser's strategy. The targeted approach and the tailored approach may work in conjunction or separately with any order of precedence. In certain embodiments, the targeted approach and the tailored approach may be implemented in association with products offered through the bazaar section of the system 102, for example.

In various embodiments, a business interface module 106P may be provided and implemented to communicate with businesses or other entities that wish to pursue commercial activities through the social network system 102. The business interface module 106P can be programmed to allow the listing and selling of products in the bazaar or other online store. The module 106P can also facilitate purchasing advertising space through the system 102, either through an online tool or by connecting to sales agents, for example. It can be appreciated that information collected and stored in the system 102 by information gathering, analytics, advertising, or other processing may be used to determine the price of advertising space and fees for selling products on the online store. In addition, business account information can be collected and stored to analyze and identify market size and opportunities for the system 102. For example, companies opening business accounts through the system 102 may be required to provide information related to the products they advertise and the company itself. Such information can be processed through the analytical module 106M, for example. In various embodiments, artists may use the business interface module 106P to create a business account for offering representations of works of art (e.g., selling song recordings) or other merchandise through the bazaar, for example. Artists may also be permitted to have access to the advertising platform 106O, for example, to communicate advertising content to various users of the system 102. In other embodiments, an artist profile may include options or features for offering products related to the artist or works of art, for example, and/or for communicating advertising content through the system 102.

In certain embodiments, a quality control commission can be implemented to verify that artists and their tracks are genuine and that they meet the quality criteria of the commissioners. Quality checks can be executed on any artist at any time, on new ones and on older ones. In one example, a battle authorization can be implemented for new registered artists: the artists can be allowed to open an artist account, register in the genre championship, load tracks, and have tracks played on the artist profile. But the new artist may not be permitted to challenge, be challenged, and participate in battles until the battle authorization is issued. The battle authorization can be suspended and reissued for already authorized users under various circumstances.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or a combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as when it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A social network system for conducting competitions between artists involving works of art respectively associated with each artist, the system comprising:
    an electronic processor programmed for executing a function associated with at least one module;
    an artist profile module programmed for:
        receiving, by the processor, a representation of at least one work of art into at least one track of a track panel of an artist profile, and receiving, by the processor, a selection of at least one of the tracks for a competition, displaying, by the processor, at least one graphical user interface associated with the artist profile module, displaying, by the processor, at least one graphical user interface element associated with receiving the work of art representation into the track of the track panel, and displaying, by the processor, at least one graphical user interface element associated with receiving the selection of the track for the competition; and a battle module programmed for:

communicating, by the processor, a challenge from a first artist profile to a second artist profile;

receiving, by the processor, an answer from the second artist profile to the challenge by the first artist profile, when the challenge is accepted, initiating, by the processor, a competition between a first work of art representation, stored in a selected track of a track panel of the first artist profile, and a second work of art representation, stored in a selected track of a track panel of the second artist profile, selecting, by the processor, the first artist profile and the second artist profile associated with the initiated competition to be operated in a championship designation framework, and receiving, by the processor, at least one indication of preference from at least one voter regarding the first work of art representation and the second work of art representation, displaying, by the processor, at least one graphical user interface associated with the battle module, displaying, by the processor, at least one graphical user interface element associated with the challenge from the first artist profile to the second artist profile, displaying, by the processor, at least one graphical user interface element associated with receiving the answer from the second artist profile to the challenge by the first artist profile, displaying, by the processor, when the challenge is accepted, at least one graphical user interface element associated with the competition between the first work of art representation and the second work of art representation, and displaying, by the processor, at least one graphical user interface element associated with receiving the indication of preference from the at least one voter regarding the first work of art representation and the second work of art representation.

2. The system of claim 1, further comprising the artist profile module programmed to limit access to artists producing original works of art.

3. The system of claim 1, further comprising the artist profile module programmed for receiving information regarding a genre associated with the work of art representation.

4. The system of claim 1, further comprising determining a winner of the competition between the first work of art representation and the second work of art representation in response to an indication of preference received from one or more voters.

5. The system of claim 1, further comprising a scoring module programmed for calculating a score for at least one of the first artist profile or the second artist profile in response to at least one of an outcome of the competition, user actions and/or interactions, or condition fulfillment.

6. The system of claim 5, further comprising a ranking module programmed for determining a ranking or a class for at least one artist profile in response to the calculated score.

7. The system of claim 1, further comprising a module programmed for calculating a score in response to a correspondence between at least one vote by a voter and an outcome of at least one battle on which the voter has voted.

8. The system of claim 1, further comprising the battle module programmed for displaying a panel including one or more competitions currently running in the social network system.

9. The system of claim 8, further comprising the battle module programmed for receiving at least one vote from a voter through the panel of currently running competitions.

10. The system of claim 1, further comprising the battle module programmed for displaying at least one competition to a user at random from among all competitions currently running in the social network system.

11. The system of claim 1, further comprising the battle module programmed for displaying at least one competition in response to an input associated with a genre of a work of art.

12. The system of claim 1, further comprising the battle module programmed for displaying at least one competition in response to an input associated with a selected class of artist.

13. The system of claim 1, further comprising the battle module programmed for receiving a vote from a voter through a championship section.

14. The system of claim 1, further comprising a bulletin module programmed for displaying news associated with one or more competitions, works of art, artists, voters, or activities occurring within the social network system.

15. The system of claim 14, further comprising the bulletin module as programmed for displaying news by one or more importance parameters.

16. The system of claim 15, wherein the importance parameter includes at least one of a class of artist, a number of voters voting in a battle, or a number of artist supporters.

17. The system of claim 1, further comprising a journal module programmed for displaying information derived from at least one expert associated with at least one work of art.

18. The system of claim 1, further comprising a bazaar module programmed for displaying an online store of products and services.

19. The system of claim 1, further comprising an analytical module programmed to collect, record, or analyze data associated with one or more transactions occurring within the social network system.

20. The system of claim 19, wherein at least a portion of the collected data is associated with user information.

21. The system of claim 1, further comprising an automation module programmed for receiving at least one communication from an analytical module and for executing at least one command in response to at least one data condition or triggering event.

22. The system of claim 1, further comprising an advertising and sales communication module programmed for monitoring at least one transaction occurring within the social network system and for communicating advertising content in accordance with the monitoring of the at least one transaction.

23. The system of claim 22, further comprising the advertising and sales communication module programmed for communicating a tailored advertising content in response to at least a portion of user information collected in the social network system.

24. The system of claim 1, further comprising a module programmed for executing at least one game over rule in response to at least a portion of data stored within the social network system.

25. A method for conducting competitions between artists involving works of art respectively associated with each artist, the method comprising:
receiving, by an electronic processor, a representation of at least one work of art into at least one track of a track panel of a first artist profile;
receiving, by the electronic processor, a representation of at least one work of art into at least one track of a track panel of a second artist profile;
receiving, by the processor, a selection of at least one track of the track panel of the first artist profile and/or the second artist profile for a competition;
displaying, by the processor, at least one graphical user interface associated with at least one of the artist profiles;
displaying, by the processor, at least one graphical user interface element associated with receiving at least one work of art representation into at least one of the track panels;
displaying, by the processor, at least one graphical user interface element associated with receiving the selection of the track for the competition;
communicating, by the processor, a challenge from a first artist profile to a second artist profile;
displaying, by the processor, at least one graphical user interface element associated with the challenge from the first artist profile to the second artist profile;
receiving, by the processor, an answer from the second artist profile to the challenge by the first artist profile;
displaying, by the processor, at least one graphical user interface element associated with receiving the answer from the second artist profile to the challenge by the first artist profile;
when the challenge is accepted, initiating, by the processor, a competition between a first work of art representation, stored in a selected track of a track panel of the first artist profile, and a second work of art representation, stored in a selected track of a track panel of the second artist profile;
selecting, by the processor, the first artist profile and the second artist profile associated with the initiated competition to be operated in a championship designation framework;
displaying, by the processor, when the challenge is accepted, at least one graphical user interface element associated with the competition between the first work of art representation and the second work of art representation;
receiving, by the processor, at least one indication of preference from at least one voter regarding the first work of art representation and the second work of art representation; and
displaying, by the processor, at least one graphical user interface element associated with receiving the indication of preference from the at least one voter regarding the first work of art representation and the second work of art representation.

26. The method of claim 25, further comprising determining a winner of the competition between the first work of art representation and the second work of art representation in response to an indication of preference received from one or more voters.

27. The method of claim 25, further comprising calculating a score for at least one of the first artist profile or the second artist profile in response to at least one of an outcome of the competition, user actions and/or interactions, or condition fulfillment.

28. The method of claim 27, further comprising determining a ranking or a class for at least one artist profile in response to the calculated score.

29. The method of claim 25, further comprising calculating a score in response to a correspondence between at least one vote by a voter and an outcome of at least one battle on which the voter has voted.

30. The method of claim 25, further comprising executing at least one game over rule in response to at least a portion of data stored within the social network system.

* * * * *